United States Patent
Meyer et al.

(10) Patent No.: US 9,904,321 B2
(45) Date of Patent: Feb. 27, 2018

(54) WEARABLE ELECTRONIC DEVICES AND COMPONENTS THEREOF

(71) Applicant: INTEL CORPORATION, Santa Clara, CA (US)

(72) Inventors: Thorsten Meyer, Regensburg (DE); Dirk Plenkers, Regensburg (DE); Hans-Joachim Barth, Munich (DE); Bernd Waidhas, Pettendorf (DE); Yen Hsiang Chew, Georgetown (MY); Kooi Chi Ooi, Glugor (MY); Howe Yin Loo, Sungai Petani (MY)

(73) Assignee: INTEL CORPORATION, Santa Clara, CA (US)

( * ) Notice: Subject to any disclaimer, the term of this patent is extended or adjusted under 35 U.S.C. 154(b) by 88 days.

(21) Appl. No.: 14/778,070

(22) PCT Filed: Nov. 12, 2014

(86) PCT No.: PCT/US2014/065332
§ 371 (c)(1),
(2) Date: Sep. 17, 2015

(87) PCT Pub. No.: WO2016/076866
PCT Pub. Date: May 19, 2016

(65) Prior Publication Data
US 2016/0274621 A1    Sep. 22, 2016

(51) Int. Cl.
*G06F 1/16*     (2006.01)
*B29C 39/02*     (2006.01)
(Continued)

(52) U.S. Cl.
CPC ............ *G06F 1/163* (2013.01); *B29C 39/021* (2013.01); *B29C 39/10* (2013.01);
(Continued)

(58) Field of Classification Search
CPC ....... G06F 1/163; G06F 3/014; B29C 39/021; B29C 39/10; B29C 65/4825; G02C 5/143; G02C 11/10; B29L 2031/3481
(Continued)

(56) References Cited

U.S. PATENT DOCUMENTS

| 4,069,659 | A | 1/1978 | Harris et al. |
| 6,415,176 | B1 * | 7/2002 | Scheirer ............... A61B 5/0531 600/547 |

(Continued)

FOREIGN PATENT DOCUMENTS

| JP | 2001168534 A | 6/2001 |
| JP | 2007150179 A | 6/2007 |

(Continued)

OTHER PUBLICATIONS

International Search Report and Written Opinion dated Jun. 30, 2015, issued in corresponding International Application No. PCT/US2014/065332, 14 pages.

(Continued)

*Primary Examiner* — Steven T Sawyer
*Assistant Examiner* — Sagar Shrestha
(74) *Attorney, Agent, or Firm* — Schwabe, Williamson & Wyatt, P.C.

(57) ABSTRACT

Embodiments of wearable electronic devices, components thereof, and related systems and techniques are disclosed herein. For example, a wearable electronic device may include a wearable support structure having a first surface and a second surface; a first electrode located at the first surface, wherein, when the wearable electronic device is worn by a user on a portion of the user's body, the first electrode is arranged to contact the user's skin in the portion of the user's body; a second electrode located at the second surface, wherein, when the wearable electronic device is (Continued)

worn by a user on the portion of the user's body, the second electrode is arranged to not contact the user's skin in the portion of the user's body; and a resistance switch having first and second input terminals coupled to the first and second electrodes, respectively. Other embodiments may be disclosed and/or claimed.

10 Claims, 11 Drawing Sheets

(51) Int. Cl.
    *B29C 39/10*     (2006.01)
    *B29C 65/48*     (2006.01)
    *G02C 5/14*     (2006.01)
    *G02C 11/00*     (2006.01)
    *B29L 31/34*     (2006.01)

(52) U.S. Cl.
    CPC .......... *B29C 65/4825* (2013.01); *G02C 5/143* (2013.01); *G02C 11/10* (2013.01); *B29L 2031/3481* (2013.01)

(58) Field of Classification Search
    USPC ...................................................... 361/679.03
    See application file for complete search history.

(56) References Cited

U.S. PATENT DOCUMENTS

| | | | | |
|---|---|---|---|---|
| 6,522,603 | B1* | 2/2003 | Miyahara | G04C 10/00 368/203 |
| 9,546,919 | B2* | 1/2017 | Nobe | G01L 1/162 |
| 2001/0043514 | A1* | 11/2001 | Kita | A44C 5/0015 368/281 |
| 2002/0030585 | A1* | 3/2002 | Doi | A61B 5/0028 340/5.64 |
| 2007/0109491 | A1 | 5/2007 | Howell et al. | |
| 2007/0279584 | A1 | 12/2007 | Howell et al. | |
| 2010/0045928 | A1 | 2/2010 | Levy | |
| 2011/0087300 | A1* | 4/2011 | Van Den Eerenbeemd | A63F 13/28 607/2 |
| 2011/0134074 | A1* | 6/2011 | Norieda | G06F 1/163 345/174 |
| 2011/0213664 | A1 | 9/2011 | Osterhout et al. | |
| 2013/0030320 | A1* | 1/2013 | Maier | A61B 5/0531 600/547 |
| 2015/0126845 | A1* | 5/2015 | Jin | G02B 27/017 600/383 |
| 2015/0185763 | A1* | 7/2015 | Idsinga | G06F 1/163 361/679.03 |
| 2015/0360030 | A1* | 12/2015 | Cartledge | A61N 1/0472 607/60 |
| 2016/0070339 | A1* | 3/2016 | Crawford | A61B 5/01 345/156 |
| 2016/0070393 | A1* | 3/2016 | Sharma | G06F 1/163 345/174 |
| 2016/0178904 | A1* | 6/2016 | Deleeuw | G06F 3/013 345/8 |
| 2016/0310049 | A1* | 10/2016 | Rowe | A61B 5/1477 |

FOREIGN PATENT DOCUMENTS

| | | |
|---|---|---|
| JP | 2011091680 A | 5/2011 |
| JP | 2012166003 A | 9/2012 |
| KR | 10-1058058 B1 | 8/2011 |
| TW | 201234070 A | 8/2012 |
| WO | WO2011132129 A1 | 10/2011 |
| WO | 2014025430 A1 | 2/2014 |

OTHER PUBLICATIONS

Search Report dated Oct. 24, 2016 for Taiwanese Application No. 104132418, 2 pages.
Office Action dated Jan. 19, 2017 for Korean Application No. 2015-7028239, 11 pages.
Office Action dated May 31, 2017 for European Application No. 14889183.1, 9 pages.
Office Action dated Jul. 26, 2017 for Korean Application No. 2015-7028239, 9 pages.
Office Action dated Aug. 17, 2017 for Korean Application No. 2017-7007591, 9 pages.
Office Action dated Nov. 9, 2017 for Taiwanese Application No. 104132418, 4 pages.

* cited by examiner

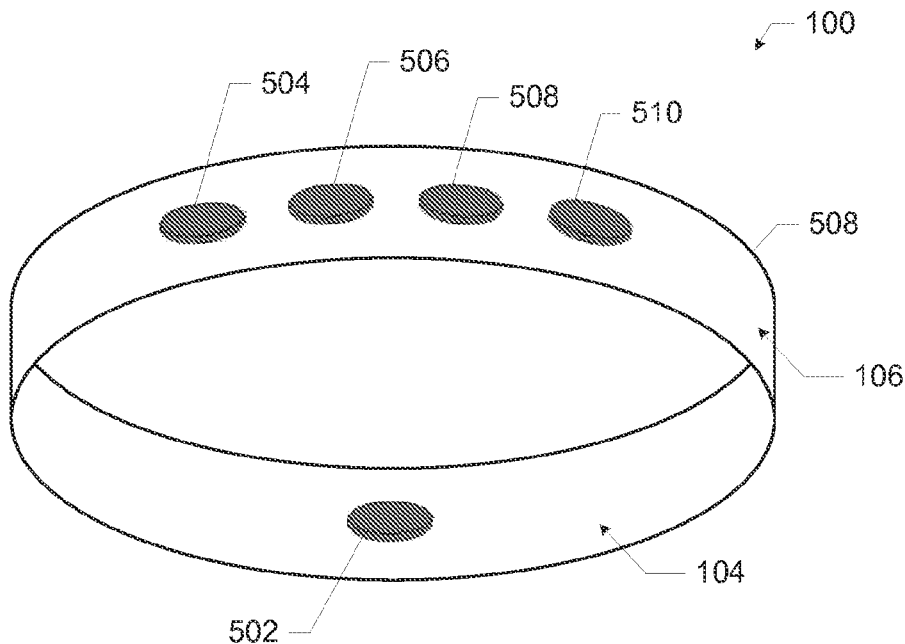

FIG. 5

```
                                    ┌─ 600
┌─────────────────────────────────────┐
│ Provide a wearable support structure having a first
│ surface and a second surface, a first electrode located at
│ the first surface and arranged to contact the user's skin
│ in the portion of the user's body, a second electrode
│ located at the second surface and arranged to not
│ contact the user's skin in the portion of the user's body,
│ and a resistance switch coupled between the first
│            electrode and the second electrode
│                          602
└─────────────────────────────────────┘
                    │
                    ▼
┌─────────────────────────────────────┐
│ Couple the resistance switch between two terminals of a
│   load circuit such that, when the wearable computing
│     device is worn by the user on the first portion of the
│  user's body and the user contacts the second electrode
│   with a second portion of the user's body, a current is
│               supplied to the load circuit
│                          604
└─────────────────────────────────────┘
```

FIG. 6

WEARABLE ELECTRONIC DEVICES AND COMPONENTS THEREOF

CROSS-REFERENCE TO RELATED APPLICATION

The present application is a national phase entry under 35 U.S.C. § 371 of International Application No. PCT/US2014/065332, filed Nov. 12, 2014, entitled "WEARABLE ELECTRONIC DEVICES AND COMPONENTS THEREOF," which designates the United States of America, the entire disclosure of which is hereby incorporated by reference in its entirety and all purposes.

TECHNICAL FIELD

The present disclosure relates generally to the field of computing devices, and more particularly, to wearable electronic devices and components thereof.

BACKGROUND

Over the last decade, interest in wearable electronic devices has increased. However, conventional design, manufacturing, and packaging techniques have limited the performance and capabilities of wearable electronic devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 5 is a perspective view of a wearable electronic device having a bracelet as a wearable support structure, in accordance with various embodiments.

FIG. 6 is a flow diagram of a first method of manufacturing a wearable electronic device, in accordance with various embodiments.

DETAILED DESCRIPTION

Figure 1:
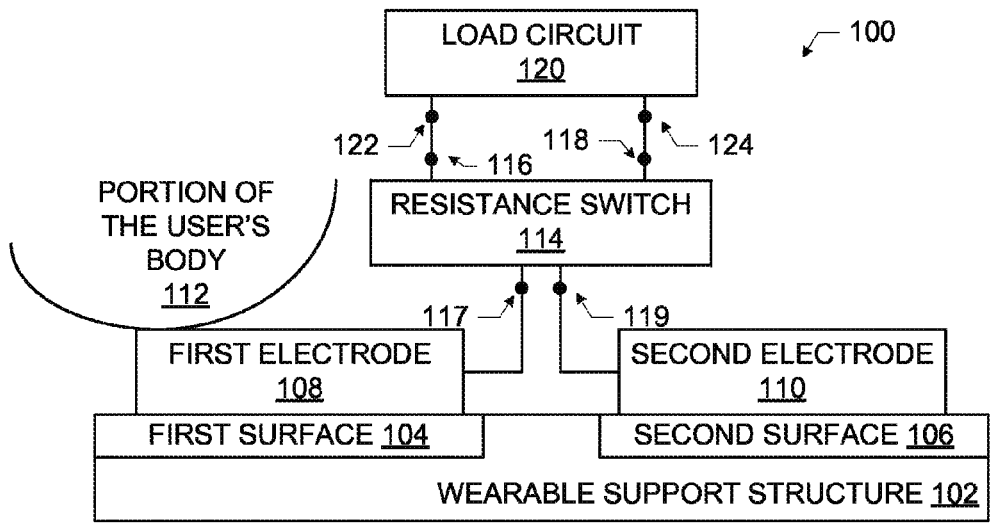
FIG. 1 is a block diagram of a wearable electronic device having a resistance switch, in accordance with various embodiments.

Wearable electronic devices present a new market for computing technology, but also new challenges. Wearable electronic devices typically have reduced functionality compared to conventional desktop, portable, and mobile devices. For example, wearable electronic devices are typically smaller than conventional devices and may have particular requirements that may be challenging to meet (e.g., limited power consumption, increased reliability, and/or increased humidity/water resistance). Additionally, the functionality desired for wearable electronic devices may be different from the functionality typically implemented in mobile computing devices. For example, wearable electronic devices may be more suitable for performing special tasks, such as providing a user interface for control of a device different from the wearable electronic device.

Switches provide one example of a user interface device for which conventional technology may not provide a suitable solution for wearable electronic devices. Conventional switches, such as capacitive switches, mechanical switches, and knobs, may have complex mechanical structures that may fail too early and/or too often during use. Moreover, their complex mechanical structures make these conventional switches relatively expensive, not robust enough to withstand daily wear, too large for inclusion in desired wearable support structures, and difficult to provide with sufficient humidity/water resistance. Some of these conventional switches also require a global constant level of power consumption to keep them "awake," which may not be available in a power-conscious wearable electronic device context. Various ones of the embodiments disclosed herein may provide inexpensive, robust, and easy to use switches for wearable electronic device applications. For example, in some embodiments, a wearable electronic device may include a resistance switch coupled to a first electrode in "permanent" contact with the user's body (e.g., when the wearable electronic device is worn) and a "touchable" second electrode. When the user touches the second electrode, the switch may be triggered. Such wearable electronic devices may have low power consumption, may be highly robust and able to be humidity/water-proofed, maybe easy to use, may occupy a small area (an important consideration for small wearable devices like rings, wristbands, watches, or glasses), and/or may be extremely cost-effective to manufacture.

Additionally, conventional semiconductor packaging technologies have generated substantially rectangular packages that are not readily integrated into wearable electronic devices. For example, a conventional "square" semiconductor package may loosely fit into a chassis of a host wearable device, but additional mechanisms may be needed to snugly hold the conventional semiconductor package in the chassis. Conventional semiconductor packages may require additional support mechanisms to connect electrical pins on the chassis to the input/output (I/O) pads on the semiconductor package substrate and to ensure that the electrical pins and the I/O pads are flush. Moreover, conventional printed circuit board (PCB)-based semiconductor packages include silicon modules mounted on a conventional package substrate in order to socket the silicon onto a PCB (as is done in conventional desktop and laptop computing systems). However, it is recognized herein that silicon dies may need not be mounted on conventional substrates for inclusion in a wearable device, and thus the package substrate may be eliminated from the silicon package assembly of a wearable electronic device, in some embodiments, and reduce the size and overall cost of the wearable electronic device.

Disclosed herein are wearable electronic devices that include molded components in which an embedded die is connected to a conductive pad located at an outer surface of an embedding mold compound. In some embodiments, these devices may provide unique, substrate-less semiconductor package assemblies in which the semiconductor package can assume an arbitrary shape or form factor that can snugly fit into a chassis (e.g., a socket) of a host wearable support structure (e.g., a host wearable electronic device). In some embodiments, I/O pads on the package assembly may be placed at any convenient location on the outer surface of the assembly so that the pads may easily and snugly make electrical contact with electrical pins or other structures (generally referred to herein as "pads" or "contacts") included in the chassis of the host wearable support structure, without the need for additional support or interconnect mechanisms. This may reduce cost and improve reliability.

Moreover, various embodiments of such wearable electronic devices may enable the positioning of I/O pads at arbitrary locations on an outer surface of the molded component, and thus may free designers from the constraint that I/O pads be limited to the "land" side of a package substrate. Indeed, the conductive pads may be held in place by the mold compound, rather than by a substrate, in contrast to conventional devices. In some embodiments, the molded component may include embedded wirebonded interconnects between conductive contacts on the die and conductive pads at the outer surface of the mold compound. This use of wirebonding may be entirely different than conventional wirebonding approaches, in which bond wires were limited to coupling a die to a substrate or a die to another die.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description uses the phrases "in an embodiment," or "in embodiments," which may each refer to one or more of the same or different embodiments. As used herein, the phrase "coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be coupled to each other when both elements communicate with a common element (e.g., a memory device). Furthermore, the terms "comprising," "including," "having," and the like, as used with respect to embodiments of the present disclosure, are synonymous. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

FIG. 1 is a block diagram of a wearable electronic device 100, in accordance with various embodiments. The device 100 may include a wearable support structure 102 having a first surface 104 and a second surface 106. In some embodiments, the first surface 104 and the second surface 106 may be disposed on a common side or face of the wearable support structure 102, while in other embodiments, the first surface 104 and the second surface 106 may be disposed on different sides or faces of the wearable support structure 102. A number of variations on the relative positioning of the first surface 104 and the second service 106 are discussed herein (e.g., with reference to FIGS. 3-5), but any suitable arrangement of the first surface 104 and the second surface 106 may be used. The wearable support structure 102 may include any suitable wearable support structure, such as a piece of jewelry (e.g., earrings, bracelet, ring, wristband, body piercing jewelry, or necklace), a garment of clothing (e.g., shirt, undergarment, socks or tights, gloves, pants, skirt, dress, shoes, or hat), or another wearable accessory (e.g., glasses, scarves, earmuffs, goggles, chest strap for a heart rate monitor or other device, armband, bandage, brace or other orthopedic support structure, pen, pendant, or insulin pump or other wearable medical device).

The device 100 may include a first electrode 108 located at the first surface 104. As used herein, an "electrode" may be any electrically conductive material arranged to serve as an electrical contact point with a user's body. The first electrode 108 and the first surface 104 may be arranged such that, when the device 100 is worn by a user on a portion of the user's body 112 (e.g., in accordance with the standard use of the wearable support structure 102), the first electrode 108 is arranged to contact the users skin in the portion of the user's body 112. The device 100 may also include a second electrode 110 located at the second surface 106. The second electrode 110 and the second surface 106 may be arranged such that, when the device 100 is worn by a user on the portion of the user's body 112 (e.g., in accordance with the standard use of the wearable support structure 102), the second electrode 110 is arranged to not contact the users skin in the portion of the user's body 112. Although electrodes depicted in various ones of the FIGS. may be illustrated as having footprints of particular shapes (e.g., circular), electrodes with any suitable shape may be used in accordance with the devices disclosed herein. In some embodiments, a shape of an electrode may be chosen to conform to the surface at which the electrode is located or to a portion of the user's body that the electrode is intended to contact.

For example, in some embodiments in which the wearable support structure 102 is shaped for wearing as an earring, the portion of the user's body 112 may be the user's ear lobe. The first surface 104 may be a surface of the earring that contacts the skin of the user's ear lobe when the earring is worn, and the first electrode 108 may be located at the first surface 104. For example, the first electrode 108 may be a metallic post used to secure the earring to the user's ear lobe, as conventionally known. The second surface 106 may be a surface of the earring that does not contact the skin of the users ear lobe when the earring is worn (e.g., a surface of the earring that faces "away" from the users ear lobe), and the second electrode 110 may be located at the second surface 106 so as to not contact the skin of the user's ear lobe when the earring is worn. This embodiment is simply illustrative, and any suitable arrangements may be used (e.g., any of the arrangements discussed below with reference to FIGS. 3-5). In some embodiments, the first electrode 108 may extend away from the first surface 104 (e.g., and press gently into the users skin) in order to increase the likelihood of reliable contact between the first electrode 108 and the users body. In such embodiments, the first electrode 108 may be disposed on the first surface 104 or may be at least partially embedded in the first surface 104.

The device 100 may also include a resistance switch 114. As used herein, a "resistance switch" may refer to a component having two electrodes spaced apart such that, when a conductive material (e.g., a portion of the users body) bridges the two electrodes so as to change the resistance between them, a state of the component changes so as to indicate that such bridging has taken place. For example, when two electrodes of a resistance switch are bridged, a voltage or resistance seen at a pair of output terminals may change, or a current may flow between a pair of output terminals. The resistance switch 114 may be coupled between the first electrode 108 and the second electrode 110. In particular, the resistance switch 114 may include a first input terminal 117, a second input terminal 119, a first output terminal 116, and a second output terminal 118. As is conventionally known for resistance switches, changing the resistance between the first input terminal 117 and the second input terminal 119 may cause a change in voltage between the first output terminal 116 and the second output terminal 118. In particular, in some embodiments, providing a current pathway between the first input terminal 117 and the second input terminal 119 may cause a change in voltage between the first output terminal 116 and the second output terminal 118.

As illustrated in FIG. 1, the first input terminal 117 may be coupled to the first electrode 108 and the second input terminal 119 may be coupled to the second electrode 110. When the portion of the user's body 112 is in contact with the first electrode 108, and no portion of the user's body is in contact with the second electrode 110, no current pathway may exist between the first electrode 108 and the second electrode 110. If a portion of the user's body is brought into contact with the second electrode 110, the users body itself may provide a current pathway between the first electrode 108 and the second electrode 110. This may cause a change in voltage between the first output terminal 116 and the second output terminal 118. An example of a resistance switch 114 exhibiting such behavior is discussed below with reference to FIG. 2.

In some embodiments, a load circuit 120 may be coupled between the first output terminal 116 and the second output terminal 118 of the resistance switch 114. For example, as illustrated in FIG. 1, the load circuit 120 may have a first load terminal 122 (coupled to the first output terminal 116 of the resistance switch 114) and a second load terminal 124 (coupled to the second output terminal 118 of the resistance switch 114). A change in voltage between the first output terminal 116 and the second output terminal 118 of the resistance switch 114 (e.g., in response to changes in the resistance between the first input terminal 117 and the second input terminal 119 of the resistance switch 114) may cause current to flow across the load circuit 120 (via the first load terminal 122 and the second load terminal 124).

This voltage and/or current change may be sensed or otherwise used by the load circuit 120 as a control signal that changes some aspect of the functionality of the load circuit 120 or another circuit. For example, in some embodiments, the load circuit 120 may include a wireless transceiver control circuit arranged so that current flowing between the first load terminal 122 and the second load terminal 124 (e.g., in response to portions of a user's body contacting both the first electrode 108 and the second electrode 110) may cause a wireless transceiver to turn on and/or off. In some embodiments, the load circuit 120 may include a voice communication control circuit arranged so that current flowing between the first load terminal 122 and the second load terminal 124 may cause a voice communication session to start and/or end. In some embodiments, the load circuit 120 may include an image capture device control circuit arranged so that current flowing between the first load terminal 122 and the second load terminal 124 may cause an image capture device to capture an image. Thus, in some embodiments, the wearable electronic device 100 of FIG. 1 may include a "skin-enabled switch" for use in controlling various computing functionalities.

Although FIG. 1 illustrates a device 100 with two electrodes (the first electrode 108 and the second electrode 110) and a single resistance switch 114, any suitable number of electrodes and resistance switches may be included in the device 100, and may be arranged in any desired configuration. In particular, different computing functions may be triggered by touches on individual electrodes and/or combinations of electrodes.

For example, the device 100 may include a third electrode. In some embodiments, the third electrode may be located at the second surface 106 (along with the second electrode 110). In some such embodiments, the device 100 may include a second resistance switch having first and second input terminals coupled to the first electrode 108 and the third electrode, respectively. In such an embodiment, the resistance switch 114 may be referred to as the "first" resistance switch 114, and the first electrode 108 may serve as a common "reference point" for both the first resistance switch 114 and the second resistance switch. A user wearing the device 100 may trigger the first resistance switch 114 by bringing a portion of his or her body into contact with the second electrode 110, and may trigger the second resistance switch by bringing a portion of his or her body into contact with the third electrode. In some embodiments, the first resistance switch 114 and the second resistance switch may control different functionalities of the device 100 (e.g., contacting the second electrode 110 may cause an image capture device to capture an image, while contacting the third electrode may cause a voice call to be accepted and/or terminated). In other embodiments, the first resistance switch 114 and the second resistance switch may be triggered jointly to perform some control operation. For example, when separately triggered, the first resistance switch 114 and the second resistance switch may cause the separate image capture/voice call functionalities previously described, but when triggered at the same time, a different third functionality may be caused (e.g., a particular application may be launched on the device 100 or a device in communication with the device 100, such as a smartphone). Other non-limiting examples of functionalities that may be controlled by triggering the resistance switch 114 may include switching a Bluetooth transceiver on and off; switching a WiFi transceiver on and off; switching a wireless local area network (WLAN) transceiver on and off; causing a transmitter to send a predetermined signal via radio frequency (RF), Bluetooth, or another short-distance wireless communication protocol (e.g., at 60 gigahertz or similar); navigating in a presentation or document on a display screen (e.g., scrolling up/down or left/right, paging forward or back, advancing a slide deck); performing remote control of smartphone functions such as accepting/terminating a voice communication session or accepting/terminating a video communication session; changing the volume of playback on an audio output device; changing the track or file played by an audio or video output device; starting/stopping video recording by an image capture device; playing/pausing audio or video content; zooming a lens of an image capture device in or out; causing an image capture device to capture a still image; opening/closing a garage door; locking/unlocking a vehicle or building lock, etc. In some embodiments of systems that include voice control of computing functions, the resistance switch 114 may trigger a microphone included in the device 100 or another device to listen for a voice command.

In some embodiments, the device 100 may include a third electrode and a fourth electrode. The fourth electrode may be located at the second surface 106 (along with the second electrode 110), and the device 100 may include a second resistance switch having first and second input terminals coupled to the third electrode and the fourth electrode, respectively. In some such embodiments, the third electrode included in the device 100 may be located at the first surface 104, and may be coupled to the first electrode 108, thereby achieving the same functional possibilities as discussed above with reference to embodiments in which the first electrode 108 is "shared" between resistance switches. In other embodiments, a third electrode included in the device 100 may not be located at the first surface 104, and may instead be located at another surface.

Figure 2:
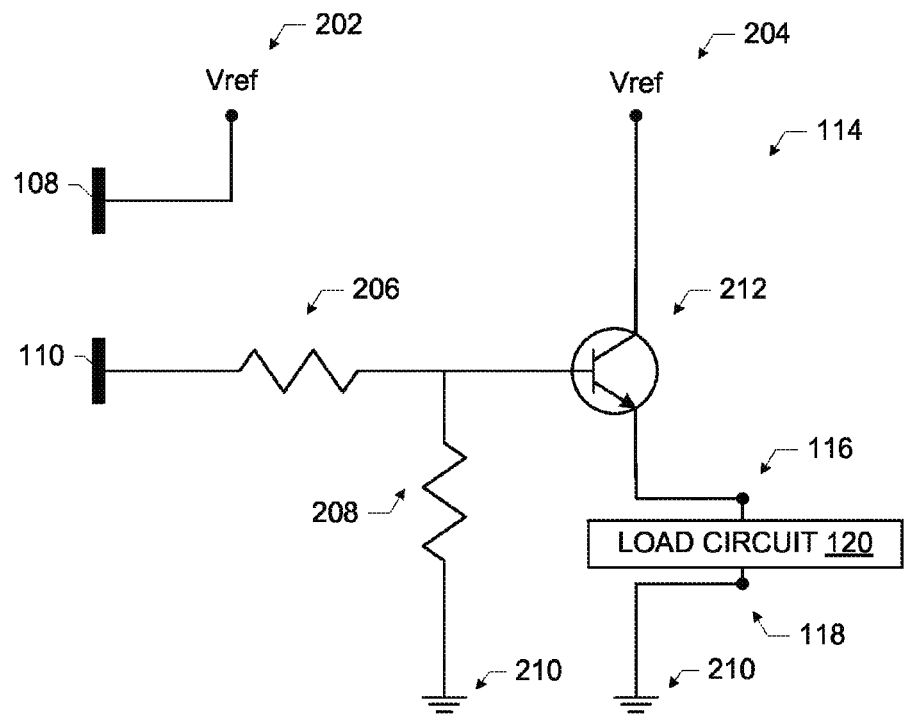
FIG. 2 is a schematic of an illustrative resistance switch, in accordance with various embodiments.

FIG. 2 is a schematic of an illustrative resistance switch 114, in accordance with various embodiments. As shown in FIG. 2, and as discussed above with reference to FIG. 1, the resistance switch 114 may have a first input terminal 117 coupled to the first electrode 108, and may have a second input terminal 119 coupled to the second electrode 110. The first input terminal 117 may also be coupled to a reference voltage 202.

The second input terminal 119 may be coupled to the base of a transistor 212 via a first resistor 206. The base of the transistor 212 may also be coupled to a ground 210 via a second resistor 208. A collector of the transistor 212 may be coupled to a reference voltage 204, while a base of the transistor 212 may be coupled to the first output terminal 116. The second output terminal 118 of the resistance switch 114 may be coupled to the ground 210. As discussed above with reference to FIG. 1, a load circuit 120 may be coupled between the first output terminal 116 and the second output terminal 118.

The resistance switch 114 illustrated in FIG. 2 is simply an example of a resistance switch that may be used in the device 100 of FIG. 1, and any suitable resistance switch may serve as the resistance switch 114. For example, in some embodiments, the resistance switch 114 may include two Darlington-paired transistors arranged so that the base of one transistor is connected to one of the electrodes 108 or 110, as conventionally known. In some embodiments, the resistance switch 114 may include an n-channel, enhancement mode, metal oxide field effect transistor whose gate is coupled to one of the electrodes 108 or 110 and to the other electrode through a resistance to a positive voltage.

Figure 3:
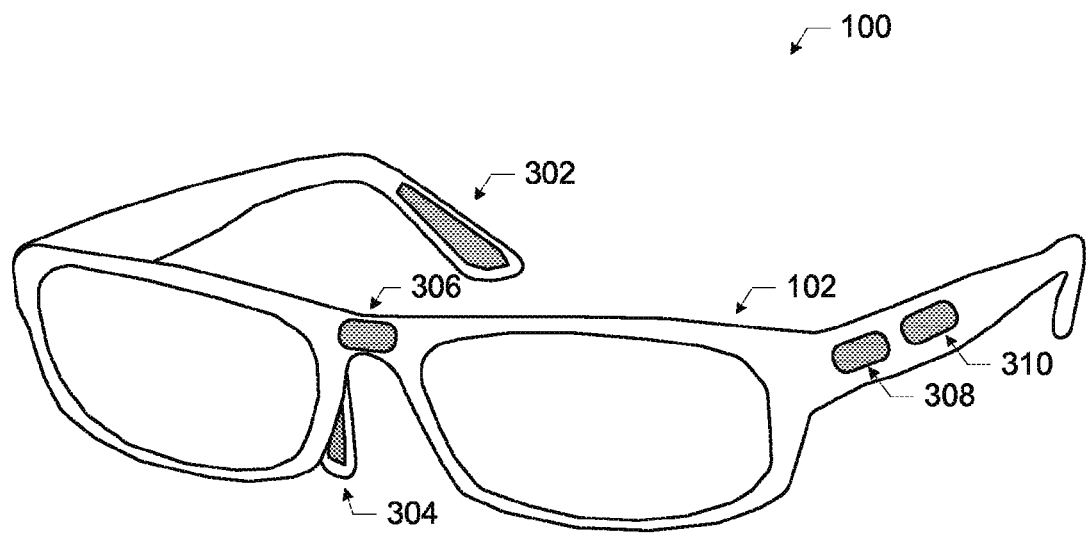
FIG. 3 is a perspective view of a wearable electronic device having a pair of glasses as a wearable support structure, in accordance with various embodiments.

FIG. 3 is a perspective view of a wearable electronic device 100 having a pair of glasses as a wearable support structure 102, in accordance with various embodiments. A number of electrodes 302-310 are shown as disposed on the wearable support structure 102 of FIG. 3, and various embodiments may include some or all of these electrodes and/or any other desired electrodes. The wearable support structure 102 of FIG. 3 may be formed from any suitable material or materials, such as a metal (e.g., copper, silver, or gold), a hard plastic, a textile (e.g., a natural or synthetic material), or any suitable composite materials or combination of materials.

The electrode 302 is shown as located on an interior of an ear piece of the wearable support structure 102. In some embodiments, the interior of the ear piece of the wearable support structure 102 may serve as the first surface 104, and the electrode 302 may serve as the first electrode 108. In particular, when the wearable support structure 102 is worn by a user, the electrode 302 may be in nearly constant contact with the user's body.

The electrode 304 is shown as located on a nose-facing portion of a nose rest of the wearable support structure 102. In some embodiments, the nose-facing portion of the nose rest may serve as the first surface 104, and the electrode 304 may serve as the first electrode 108. In particular, when the wearable support structure 102 is worn by a user, the electrode 304 may be in nearly constant contact with the user's body.

The electrode 306 is shown as located on an exterior portion of a lens frame of the wearable support structure 102. In some embodiments, the exterior portion of the lens frame may serve as the second surface 106, and the electrode 306 may serve as the second electrode 110. For example, in some embodiments, a user may touch the electrode 306 to indicate that a voice command is about to be issued to a microphone included in the device 100 or another device (e.g., a mobile device) in communication with the device 100.

The electrodes 308 and 310 are shown is located on an exterior of an ear piece of the wearable support structure 102. In some embodiments, the exterior of the ear piece of the wearable support structure 102 may serve as the second surface 106, and either of the electrodes 308 or 310 may serve as the second electrode 110. For example, in some embodiments, a user may touch the electrode 308 or the electrode 310 to indicate that a voice command is about to be issued to a microphone included in the device 100 or another device (e.g., a mobile device) in communication with the device 100.

As noted above, the size and shape of electrodes included in the device 100 may be any desired size and shape. In some embodiments, it may be desirable for an electrode to have a relatively large area so that a user need not be very accurate when contacting the electrode to trigger a resistance switch. In some embodiments, an electrode may have a texture or three-dimensional pattern so as to be readily recognized when contacted by a user's finger or other portion of the users body. In some embodiments, an electrode (e.g., the electrode 108) may be fully or partially embedded in the wearable support structure.

Figure 4:
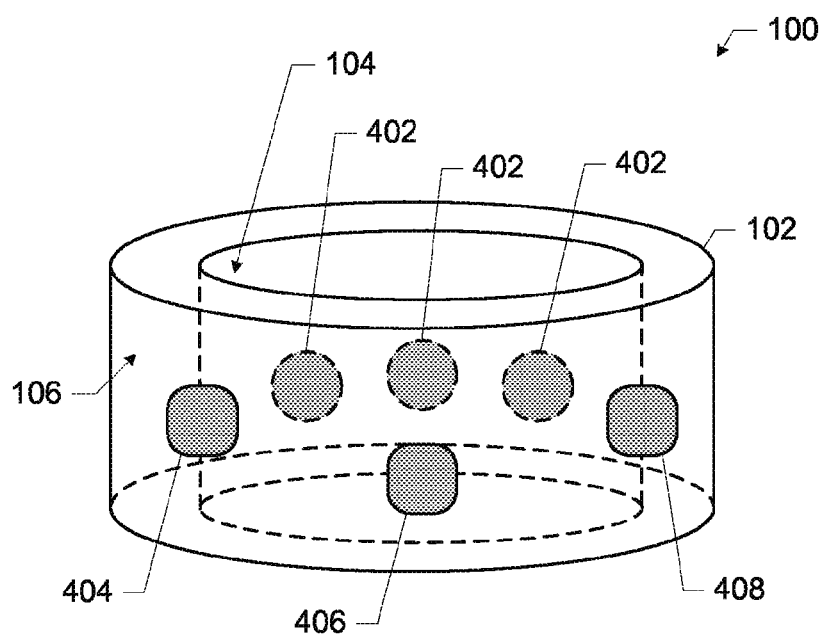
FIG. 4 is a perspective view of a wearable electronic device having a ring as a wearable support structure, in accordance with various embodiments.

FIG. 4 is a perspective view of a wearable electronic device 100 having a ring as a wearable support structure 102, in accordance with various embodiments. A number of electrodes 402-408 are shown as disposed on the wearable support structure 102 of FIG. 4, and various embodiments may include some or all of these electrodes and/or any other desired electrodes. The wearable support structure 102 of FIG. 4 may be formed from any suitable material or materials, such as a flexible material (e.g., a rubber or flexible plastic), a metal, a hard plastic, a woven material, or any suitable composite materials or combination of materials. In some embodiments, different metals or other materials may be used for the wearable support structure 102 and the electrodes 402-408 for aesthetic purposes. Any of the electrodes 402-408 may be formed from any suitable material, such as a metal (e.g., copper, silver, or gold), metal-coated polymer, or conductive polymer.

FIG. 4 depicts the interior face of the ring as the first surface 104 of the wearable support structure 102, and the exterior face of the ring as the second surface 106. Three different electrodes 402 are illustrated as located at the first surface 104 (at the interior of the ring), and any one of these electrodes 402 may serve as the first electrode 108. In some embodiments, two or more of the electrodes 402 may be coupled together so as to form a "distributed" electrode having multiple potential contact points with the skin of a user's finger when the ring is worn on the user's finger. For example, all three of the electrodes 402 may be coupled together.

Three electrodes 404, 406, and 408 are illustrated in FIG. 4 as located at the second surface 106 of the wearable support structure 102. Any one or more of the electrodes 404, 406, and 408 may serve as the second electrode 110. In some embodiments, the electrodes 404-408 may be isolated from each other. In some embodiments, the device 100 of FIG. 4 may include two or more resistance switches, each having a first input terminal coupled to one of the electrodes 402 and a second input terminal coupled to a different one of the electrodes 404, 406, and 408. For example, the device 100 of FIG. 4 may include a first resistance switch having a first input terminal coupled to one of the electrodes 402 and a second input terminal coupled to the electrode 404, and may also include a second resistance switch having a first input terminal coupled to one of the electrodes 402 and a second input terminal coupled to the electrode 406. Such embodiments may enable separate computing functionalities to be controlled independently via triggering of the first and second resistance switches, or jointly (e.g., as discussed above). In embodiments in which the electrodes 404-408 trigger different functionalities, the electrodes 404-408 may be spaced far enough apart that a user is not likely to inadvertently contact one of the electrodes 404-408 while contacting another one of the electrodes 404-408.

FIG. 5 is a perspective view of a wearable electronic device 100 having a bracelet as a wearable support structure 102, in accordance with various embodiments. A ring and a bracelet may both be examples of wearable "bands." A number of electrodes 502-510 are shown as disposed on the wearable support structure 102 of FIG. 5, and various embodiments may include some or all of these electrodes and/or any other desired electrodes. The wearable support structure 102 of FIG. 5 may be formed from any suitable material or materials, such as a flexible material (e.g., a rubber or flexible plastic), a metal, a hard plastic, a woven material, or any suitable composite materials or combination of materials.

FIG. 5 depicts the interior face of the bracelet as the first surface 104 of the wearable support structure 102, and the exterior face of the bracelet as the second surface 106. A single electrode 502 is illustrated as located at the first surface 104 (at the interior of the bracelet), and may serve as the first electrode 108. As noted above, in some embodiments, the electrode 502 may extend away from the first surface 104 (e.g., and press gently into the user's skin) in order to increase the likelihood of reliable contact between the electrode 502 and the user's body. In such embodiments, the electrode 502 may be disposed on the first surface 104 or may be at least partially embedded in the first surface 104.

Four electrodes 504, 506, 508, and 510 are illustrated in FIG. 5 as located at the second surface 106 of the wearable support structure 102. Any one or more of the electrodes 504, 506, 508, and 510 may serve as the second electrode 110. In some embodiments, the device 100 of FIG. 5 may include two or more resistance switches, each having a first input terminal coupled to the electrode 502 and a second input terminal coupled to a different one of the electrodes 504, 506, 508, and 510. For example, the device 100 of FIG. 5 may include a first resistance switch having a first input terminal coupled to the electrode 502 and a second input terminal coupled to the electrode 504, and may also include a second resistance switch having a first input terminal coupled to the electrode 502 and a second input terminal coupled to the electrode 506. Such embodiments may enable separate computing functionalities to be controlled independently via triggering of the first and second resistance switches, or jointly (e.g., as discussed above).

FIG. 6 is a flow diagram of a first method 600 of manufacturing a wearable electronic device, in accordance with various embodiments. Although operations of the method 600 may be discussed with reference to the wearable electronic device 100 and components thereof, this is simply for illustrative purposes and the method 600 may be utilized to manufacture any suitable wearable electronic device.

At 602, a wearable support structure of a wearable electronic device may be provided (e.g., the wearable support structure 102 of the wearable electronic device 100). The wearable support structure may have a first surface and a second surface (e.g., the first surface 104 and the second service 106). A first electrode (e.g., the first electrode 108) may be located at the first surface and arranged so as to contact the user's skin in a first portion of a user's body when the wearable support structure is worn on the first portion of the user's body. A second electrode (e.g., the second electrode 110) may be located at the second surface and arranged so as to not contact the user's skin in the first portion of the user's body when the wearable support structure is worn on the first portion of the user's body. A resistance switch (e.g., the resistance switch 114) may be coupled between the first electrode and the second electrode. For example, a first input terminal of the resistance switch (e.g., the first input terminal 117) may be coupled to the first electrode and a second input terminal of the resistance switch (e.g., the second input terminal 119) may be coupled to the second electrode.

At 604, the resistance switch may be coupled between two terminals of a load circuit (e.g., the load circuit 120) such that, when the wearable electronic device is worn by the user on the first portion of the user's body and the user contacts the second electrode with a second portion of the user's body, a current is supplied to the load circuit. For example, the load circuit may be coupled between first and second output terminals of the resistance switch (e.g., the first output terminal 116 and the second output terminal 118), and when the wearable electronic device is worn by the user on the first portion of the user's body and the user contacts the second electrode with a second portion of the user's body, a current flows between the first and second output terminals. In some embodiments, a voltage change may be applied to the terminals of the load circuit, and if the load circuit has very high resistance, the amount of current supplied may be very small. For example, the load circuit (which may include, for example, an operational amplifier) may be configured to detect and amplify a small voltage change from a human body activated resistance switch in order to actuate a secondary task on a different module or circuit.

The current or other signal supplied to the load circuit may be used as a control signal to trigger any of a number of computing device functions. For example, in some embodiments, the load circuit may be a wireless transceiver control circuit arranged so that the current flow causes a wireless transceiver to turn on and/or off. In some embodiments, the load circuit may be a voice communication control circuit arranged so that the current flow causes a voice communication session to start and/or end. In some embodiments, the load circuit may be an image capture device control circuit arranged so that the current flow causes an image capture device to capture an image.

Wearable electronic devices including resistance switches, as discussed above, may provide a relatively low power switching solution that makes use of the resistance change between a pair of electrodes when the two electrodes are connected through a user's body or another electrically conductive object. As noted above, in some embodiments, one electrode (e.g., the first electrode 108) is configured to be always in contact with the body of the user when the user is wearing the wearable electronic device (e.g., inside a ring, wristband, watch, or the earpiece of a pair of glasses). The other electrode (e.g., the second electrode 110) is configured to be not in contact with the user's body during normal wear, but is readily accessible by a portion of the users body (e.g., by the users finger) when the wearable electronic device is worn. Since one electrode is "always" in contact with the user's body, a simple touch on the other electrode may be sufficient to trigger the switch.

A resistance switch (e.g., the resistance switch 114) may have a much simpler construction than switches typically used in mobile computing devices (e.g., capacitance switches) and may be more suitable for use in wearable electronic devices. In particular, a resistance switch may not consume power when not triggered. A resistance switch may utilize any suitable conductive coating or conductive ink to form the electrodes, which may make the resistance switch readily adaptable in jewelry and other wearables. For example, in some embodiments, an electrode may be plated onto a non-conductive wearable support structure using a conventional plating technique. Resistance switches may also be reliable, waterproof, and/or humidity resistant (which may be particularly important for rings and other wearables exposed to the elements). Moreover, no contact force need be applied to trigger the resistance switch, minimizing wear on the device.

As indicated above, some embodiments of the wearable electronic devices disclosed herein may include embedded circuitry. The packaging of such circuitry for ready fabrication and assembly into a finished wearable electronic device may present a challenge. As disclosed herein, some wearable electronic devices may include a molded component having a die embedded therein and having conductive pads located at the outer surface. These molded components may mate with a wearable support structure (e.g., a socket of a wearable support structure), and may be used to provide computing functionality based on the circuitry included in the die.

Figure 7:
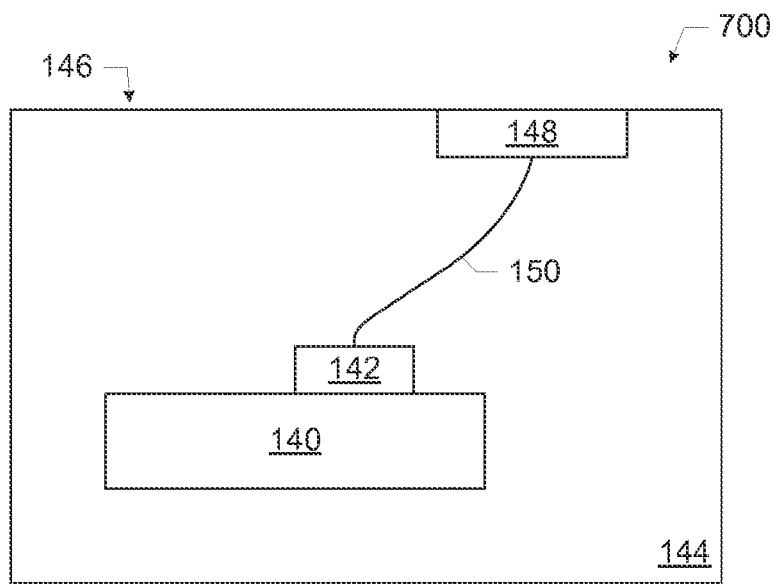
FIG. 7 illustrates a molded component of a wearable electronic device, the molded component having a conductive pad located at an outer surface of a mold compound, in accordance with various embodiments.

For example, FIG. 7 illustrates a molded component 700 that may be included in a wearable electronic device. The molded component 700 may have a conductive pad 148 located at an outer surface 146 of a mold compound 144, in accordance with various embodiments. As used herein, a "conductive pad" may be any component formed of a conductive material (e.g., a metal or a conductive plastic) arranged to serve as a contact point for the transmission of electrical signals. As used herein, a "mold compound" may be any suitable material conventionally used in molding processes for electronic devices. Examples of mold compounds may include plastic materials, polymers, thermosetting polymers, silicon composites, glass, epoxy resins, or fiberglass epoxy resins. Mold compounds may also include some filler material. For example, a mold material may be an epoxy resin with tiny grains (e.g., on the order of a micrometer) of fused silica or amorphous silicon dioxide. In the molded component 700 of FIG. 7, a die 140 may be embedded in the mold compound 144. As used herein, a "die" may be any component (e.g., a semiconductor device) in which one or more functional circuits are located. For example, the die 140 may include a single silicon die, or a stack of multiple silicon dies. The die 140 may include, for example, a system-on-a-chip (SoC) processor, one or more memory circuits (e.g., Flash memory), radio circuitry, microelectromechanical systems (MEMS), one or more sensors, any combination thereof, or any other suitable circuits.

In some embodiments, the mold compound 144 may not include a printed circuit board (PCB) embedded therein. As used herein, a "printed circuit board" may be a structure that supports multiple electronic components and interconnects these components using conductive features etched from one or more copper layers laminated onto one or more layers of insulating substrate. For example, the die 140 may not be mounted on a PCB, and instead may be directly coupled to the conductive pad 148. In other embodiments, the die 140 may be coupled to the conductive pad 148 via a piece of PCB on which the die 140 is mounted, and both the die 140 and the piece of PCB may be embedded in the mold compound 144. In some embodiments, the die 140 may include a mini-PCB.

The die 140 may have a conductive contact 142 thereon, and the molded component 700 may include an interconnect 150 coupling the conductive contact 142 of the die 140 and the conductive pad 148. In some embodiments, the conductive contacts on the die 140 (e.g., the conductive contact 142) may be located on an active side of the die 140. Conductive contacts may take any conventional form. As used herein, an "interconnect" may be a conductive material arranged to serve as an electrical pathway between two electrical contact points. In some embodiments, the interconnect 150 may be a wirebonded interconnect (e.g., using copper, aluminum, silver, gold, and/or metal alloy bond wires). Wirebonding may provide a particularly cost effective interconnect technique. Bonds may be formed between bond wires and conductive contacts using any suitable approach, such as ball bonding, wedge bonding, compliant bonding, or a combination thereof.

In some embodiments, the die 140 may be a "single-sided" die in that only one surface of the die 140 has a conductive contact 142 disposed thereon. In some embodiments, the die 140 may be a "multi-sided die" in that two or more surfaces of the die 140 have conductive contacts like the conductive contact 142 disposed thereon. For example, the die 140 may be a "double-sided" die in which one surface of the die 140 is the active side of the die 140 and another surface of the die 140 is the back side of the die 140. Conductive contacts (e.g., pads) may be formed on the back side of the die 140 and these conductive pads may be connected to the active side of the die 140 using through silicon vias (TSVs) or another suitable structure. In some embodiments, the die 140 may be a "stacked" die that includes two or more individual dies. The individual dies may be single-sided and/or double-sided. For example, the die 140 illustrated in FIG. 8 may be a stacked die.

Figure 8:
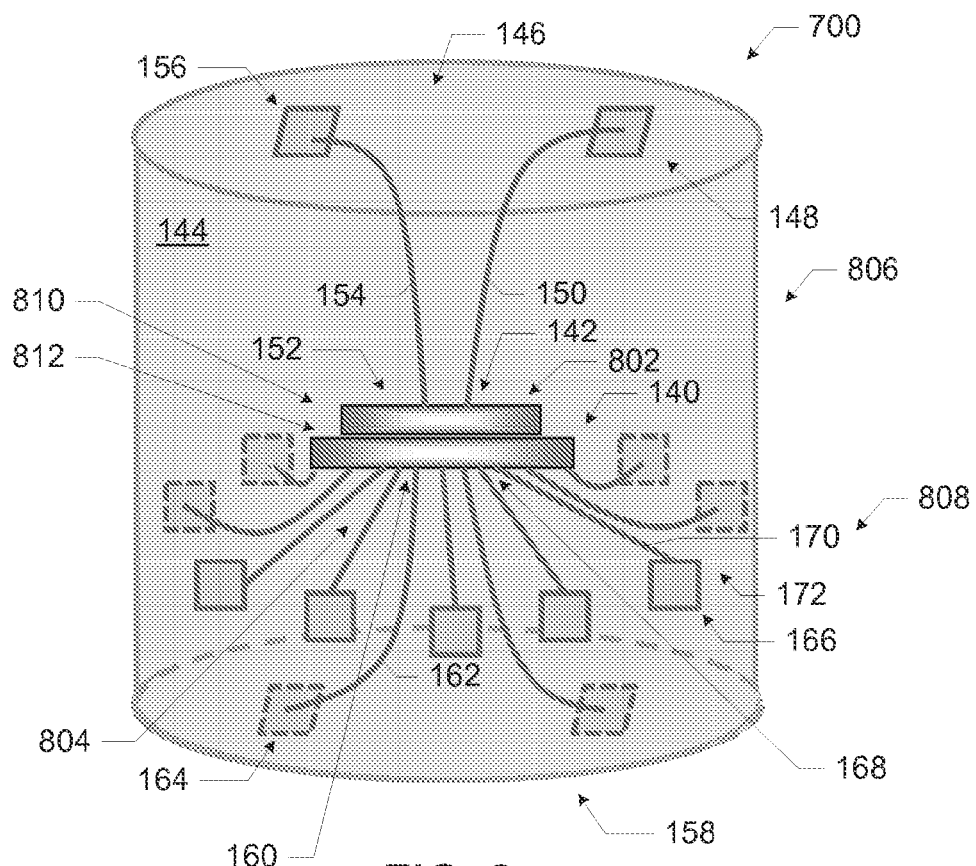
FIG. 8 illustrates a molded component of a wearable electronic device, the molded component having multiple conductive pads located at outer surfaces of a mold compound, in accordance with various embodiments.

Although FIG. 7 depicts a molded component 700 with a single conductive pad 148 located at the outer surface 146 of the mold compound 144, various molded components (e.g., included in wearable electronic devices) may include multiple conductive pads located at multiple outer surfaces of a mold compound. For example, FIG. 8 illustrates a molded component 700 having multiple conductive pads located at outer surfaces of a mold compound 144, in accordance with various embodiments. In particular, the mold compound 144 may have the conductive pad 148 located at the outer surface 146 and coupled to a conductive contact 142 on the die 140 via an interconnect 150. The mold compound 144 may also have another conductive pad 156 located at the outer surface 146 and coupled to a conductive contact 152 on the die 140 via an interconnect 154. The conductive pads located at the outer surface 146 of the mold compound 144 may act as I/O pads for electrical signals flowing to and/or from the die 140.

The die 140 may have a first portion 810 and a second portion 812. In some embodiments (e.g., as illustrated in FIG. 8), a shape of the first portion 810 may be different from a shape of the second portion 812. In other embodiments, the first portion 810 and the second portion 812 may have substantially the same shape. In general, the mold compound 144 may have any arbitrary shape that can be molded using a single or multiple-stage molding process (e.g., as discussed below with reference to FIGS. 9-16). As noted above, this may enable wearable electronic devices to be fabricated in shapes and forms that were previously impractical to manufacture.

The mold compound 144 of FIG. 8 may also include an outer surface 166. The outer surface 166 may be oriented substantially perpendicular to the outer surface 146, but this is simply for illustrative purposes, and the outer surface 166 may be oriented or shaped in any desired manner. One or more conductive pads (e.g., the conductive pad 172) may be located at the outer surface 166 and may be coupled to a conductive contact on the die 140 via an interconnect. For example, the conductive pad 172 may be located at the outer surface 166 and may be coupled to a conductive contact 168 on the die 140 via an interconnect 170.

The mold compound 144 of FIG. 8 may also include an outer surface 158. The outer surface 158 may be disposed "opposite" to the outer surface 146 and one or more conductive pads (e.g., the conductive pad 164) may be located at the outer surface 158. For example, the conductive pad 164 may be located at the outer surface 158 and may be coupled to a conductive contact 160 of the die 140 via an interconnect 162.

The die 140 itself may have various surfaces on which conductive contacts are disposed. For example, the conductive contacts 142 and 152 illustrated in FIG. 8 are located at a first surface 802 of the die 140, while the conductive contacts 160 and 168 are illustrated as located at a second surface 804 of the die 140. The first surface 802 is illustrated as "opposite" to the second surface 804. Conductive pads located at the outer surfaces of the mold compound 144 may be coupled via interconnects to any desired surface of the die 140. Thus, although the two conductive pads 148 and 156 illustrated in FIG. 8 as located at the outer surface 146 are both coupled to conductive contacts (142 and 152) located at the first surface 802 of the die 140, it need not be the case that all conductive pads located at a particular surface of the mold compound 144 be coupled to conductive contacts located at a common surface of the die 140. Manufacturing constraints and other practical considerations may dictate suitable choices of the relative positioning of conductive pads and conductive contacts.

In some embodiments, as discussed below with reference to FIGS. 9-16, the mold compound 144 may be formed as one or more portions during the manufacturing process. For example, the mold compound 144 may include an upper portion 806 and a lower portion 808. In some embodiments, the die 140 may be arranged in the mold compound 144 such that the first portion 810 of the die 140 is disposed in the upper portion 806 of the mold compound 144, and the second portion 812 of the die 140 is disposed in the lower portion 808 of the mold compound 144. None, one, or more conductive pads may be located at the outer surface of the mold compound 144 in the upper portion 806, and none, one, or more conductive pads may be located at the outer surface of the mold compound 144 in the lower portion 808. For example, in FIG. 8, the conductive pads 148 and 156 are located in the upper portion 806, and the conductive pads 172 and 164 are located in the lower portion 808. Although the shapes of the upper portion 806 and the lower portion 808 of the mold compound 144 are shown as substantially identical (e.g., mirror images of each other), this need not be the case, and the upper portion 806 may have a different shape than the lower portion 808.

FIGS. 9-16 illustrate various operations in a method for manufacturing the molded component 700 of FIG. 8, in accordance with various embodiments. The use of the molded component 700 of FIG. 8 in FIGS. 9-16 is simply illustrative, and any suitable ones of the molded components disclosed herein may be formed in accordance with the operations illustrated with reference to FIGS. 9-16.

Figure 9:
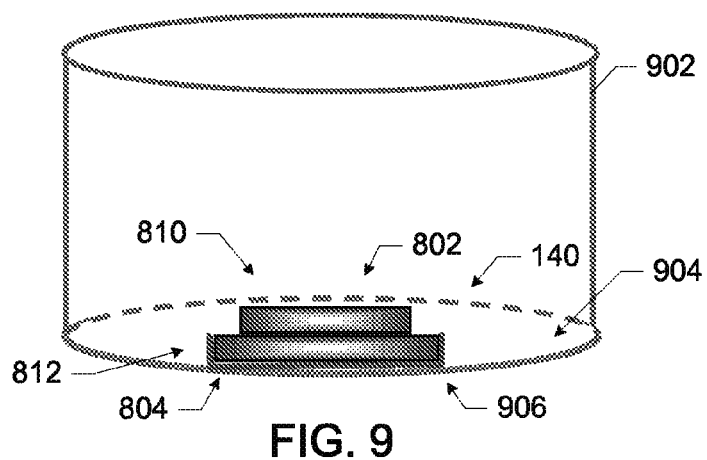
FIGS. 9-16 illustrate various operations in a method for manufacturing the molded component of FIG. 8, in accordance with various embodiments.

FIG. 9 illustrates a die 140 disposed in a first mold casting 902. As shown in FIG. 9, the die 140 may be disposed on a bottom surface 904 of the first mold casting 902. In particular, the second surface 804 of the die 140 may be in contact with the bottom surface 904 of the first mold casting 902, while the first surface 802 may "face" the interior of the first mold casting 902. In some embodiments, the bottom surface 904 may have a recess 906 that has a shape complementary to a shape of the second portion 812 of the die 104 so that the second portion 812 is received in the recess 906. The first mold casting 902 may have a shape largely complementary to a desired shape of the upper portion 806 of the mold compound 144, as discussed below. As noted above, the first mold casting 902 may take any desired shape (e.g., a cylinder, oval, heart, or any other suitable shape).

Figure 10:
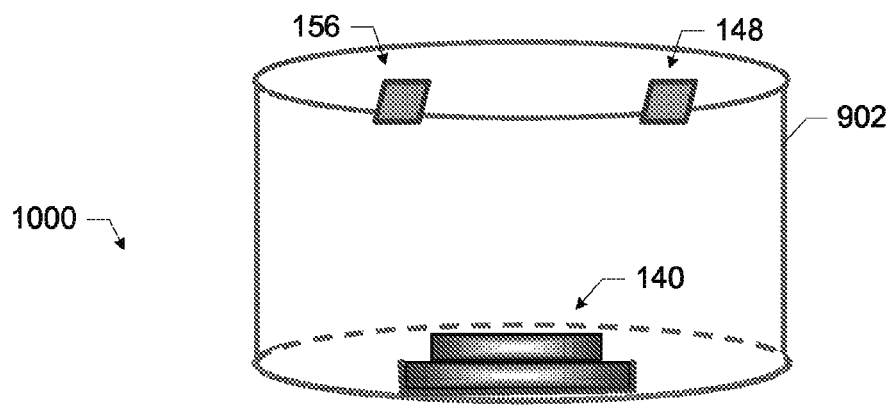

FIG. 10 illustrates an assembly 1000 subsequent to attaching two conductive pads 148 and 156 to an interior surface of the first mold casting 902. The conductive pads 148 and 156 may be "temporarily" attached to the interior surface of the first mold casting 902 in the assembly 1000, in the sense that the conductive pads 148 and 156 may be readily removed from attachment with the interior surface of the first mold casting 902 after a molding process occurs in the first mold casting 902 (e.g., after the manufacturing operations discussed below with reference to FIG. 12). For example, in some embodiments, the conductive pads 148 and 156 may be attached to the interior surface of the first mold casting 902 with an adhesive suitable for keeping the conductive pads 148 and 156 in place during the subsequent manufacturing operations involving the first mold casting 902 (e.g., during the forming of interconnects as discussed with reference to FIG. 11 and during the provision of mold compound to the interior of the first mold casting 902 as discussed with reference to FIG. 12). In some embodiments, a pressure sensitive adhesive material may be applied to one side of a conductive pad and the conductive pad may be temporarily "stuck" onto the interior surface of the first mold casting 902 (e.g., during wirebonding, as discussed below). After molding is completed (as discussed below), the mold compound may hold the pads in place while the whole molded assembly is removed from the first mold casting 902, whereby the conductive pads will also be peeled from the interior surface of the first mold casting 902. Residual pressure sensitive adhesive materials on the surface of the conductive pads may be removed through a surface cleaning process. Pressure sensitive adhesive materials (e.g., such as those used in masking tapes) may be made from suitable acrylate polymers. In other embodiments, conductive pads may be snugly placed in recesses within the first mold casting 902 (not shown) and held there through friction with or without the use of any adhesive materials. After molding is done, the conductive pads may be pulled out of their recesses as the entire molded assembly is removed from the first mold casting 902. In some embodiments, all conductive pads that are to be included on an outer surface of the mold compound 144 in the upper portion 806 may be attached to the interior surface of the first mold casting 902 as discussed herein with reference to the conductive pads 148 and 156.

Figure 11:
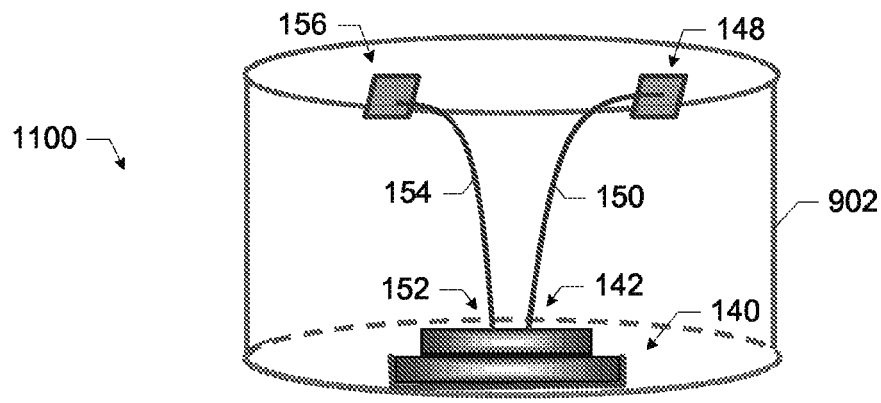

FIG. 11 illustrates an assembly 1100 subsequent to forming interconnects between the conductive pads attached to the interior surface of the first mold casting 902 and conductive contacts on the die 140. In particular, FIG. 11 illustrates the interconnect 150 formed between the conductive pad 148 and the conductive contact 142 on the die 140, and the interconnect 154 formed between the conductive pad 156 and the conductive contact 152 on the die 140. In some embodiments, the interconnects 150 and 154 may each include wires bonded or soldered to the associated conductive pads and the associated conductive contacts. For example, the interconnects 150 and 154 may be bond wires, and may be formed using a wirebonding process. In some embodiments, all interconnects between the die 140 and conductive pads that are to be located in the upper portion 806 of the mold compound 144 may be formed as described with reference to the interconnects 150 and 154 of FIG. 11.

Figure 12:
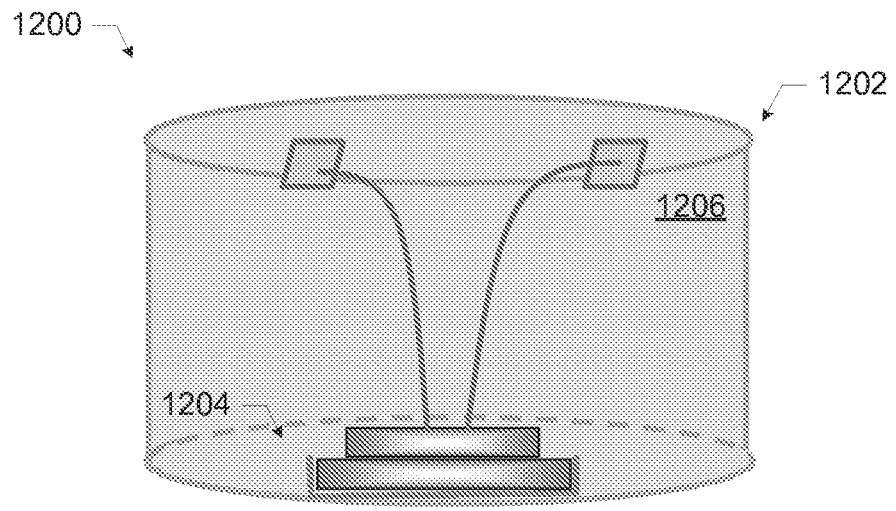

FIG. 12 illustrates an assembly 1200 subsequent to providing a mold compound 1206 to the interior of the first mold casting 902 to form a first molded portion 1202. The first molded portion 1202 may correspond to the upper portion 806 discussed above with reference to FIG. 8. In some such embodiments, the mold compound 1206 may substantially surround the first portion 810 of the die 140, and the second portion 812 of the die 140 may extend away from a bottom surface 1204 of the first molded portion 1202 (because the second portion of the die 140 was received in the recess 906, as discussed above with reference to FIG. 9). The formation of the first molded portion 1202 using the mold compound 1206 may include any conventional manufacturing operations associated with forming a molded material, such as injection molding, compression molding, and transfer molding.

Figure 13:
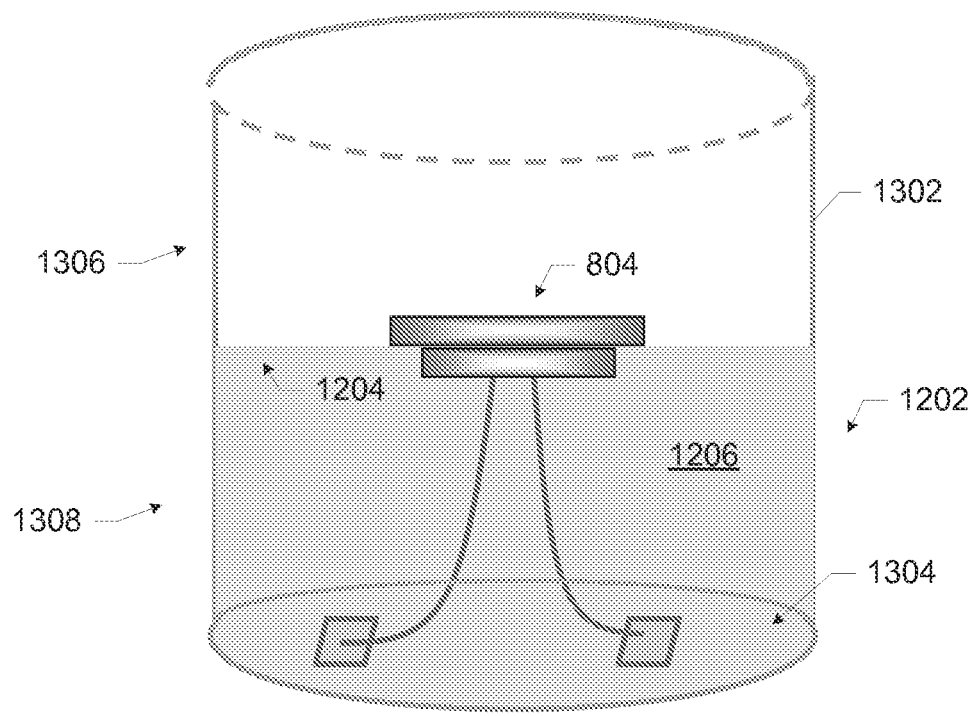

FIG. 13 illustrates the first molded portion 1202 disposed in a second mold casting 1302. As shown in FIG. 13, the first molded portion 1202 may be disposed on a bottom surface 1304 of the second mold casting 1302, and may be oriented "upside down" in the second mold casting 1302 so that the second surface 804 of the die 140 "faces" the interior of the second mold casting 1302. In some embodiments, the second mold casting 1302 may have a first portion 1306 and a second portion 1308. The second portion 1308 may be shaped complementary to the first molded portion 1202 so that, when the first molded portion 1202 is disposed in the second mold casting 1302, the bottom surface 1204 of the first molded portion 1202 may provide a new "bottom" to the interior of the second mold casting 1302. As noted above, the second surface 804 of the die 140 may extend into the interior of the second mold casting 1302 and away from the bottom surface 1204 of the first molded portion 1202. The first portion 1306 of the second mold casting 1302 may have a shape complementary to a desired shape of the lower portion 808 of the mold compound 144, as discussed below. As noted above, the second mold casting 1302 may take any desired shape (e.g., a cylinder, oval, heart, or any other suitable shape).

Figure 14:
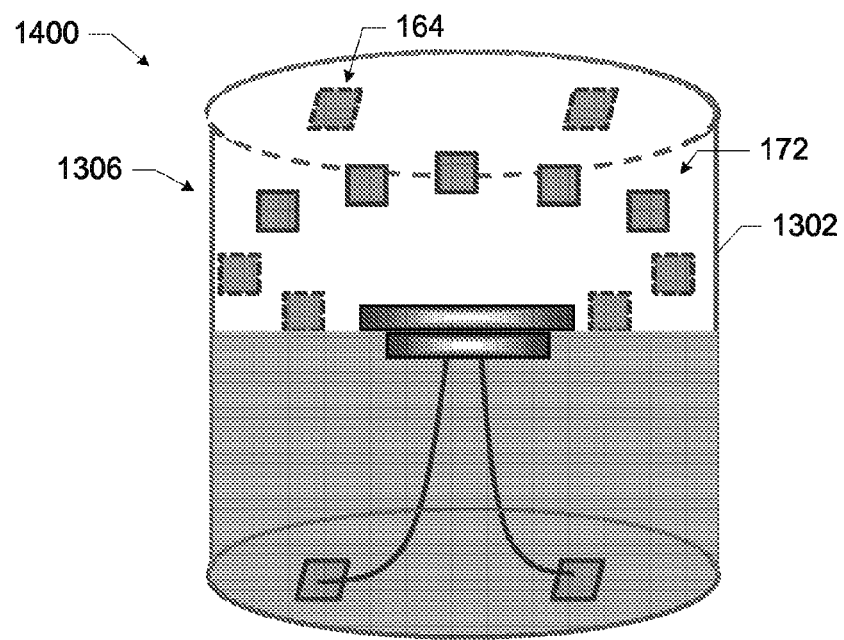

FIG. 14 illustrates an assembly 1400 subsequent to attaching one or more conductive pads (including the conductive pads 164 and 172) to an interior surface of the first portion 1306 of the second mold casting 1302. As discussed above with reference to the conductive pads 148 and 156 in the first mold casting 902, the conductive pads 164 and 172 may be "temporarily" attached to the interior surface of the second mold casting 1302 in the assembly 1400, in the sense that the conductive pads 164 and 172 may be readily removed from attachment with the interior surface of the second mold casting 1302 after a molding process occurs in the second mold casting 1302 (e.g., after the manufacturing operations discussed below with reference to FIG. 16). For example, in some embodiments, the conductive pads 164 and 172 may be attached to the interior surface of the second mold casting 1302 with an adhesive suitable for keeping the conductive pads 164 and 172 in place during the subsequent manufacturing operations involving the second mold casting 1302 (e.g., during the forming of interconnects as discussed with reference to FIG. 15 and during the provision of mold compound to the interior of the second mold casting 1302 as discussed with reference to FIG. 16). In some embodiments, all conductive pads that are to be included on an outer surface of the mold compound 144 in the lower portion 808 may be attached to the interior surface of the first portion 1306 of the second mold casting 1302, as discussed herein with reference to the conductive pads 164 and 172.

Figure 15:
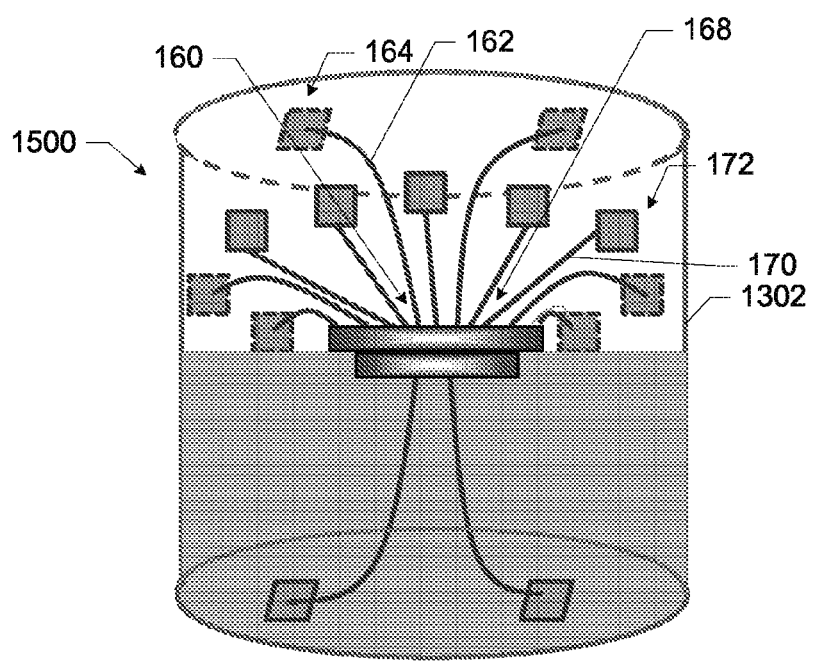

FIG. 15 illustrates an assembly 1500 subsequent to forming interconnects between the conductive pads attached to the interior surface of the first portion 1306 of the second mold casting 1302 and conductive contacts on the die 140. In particular, FIG. 15 illustrates the interconnect 162 formed between the conductive pad 164 and the conductive contact 160 on the die 140, and the interconnect 170 formed between the conductive pad 172 and the conductive contact 168 on the die 140. In some embodiments, the interconnects 162 and 170 may each include wires soldered to the associated conductive pads and the associated conductive contacts. For example, the interconnects 162 and 170 may be bond wires, and may be formed using a wirebonding process. In some embodiments, all interconnects between the die 140 and conductive pads that are to be located in the lower portion 808 of the mold compound 144 may be formed as described with reference to the interconnects 162 and 170 of FIG. 15.

Figure 16:
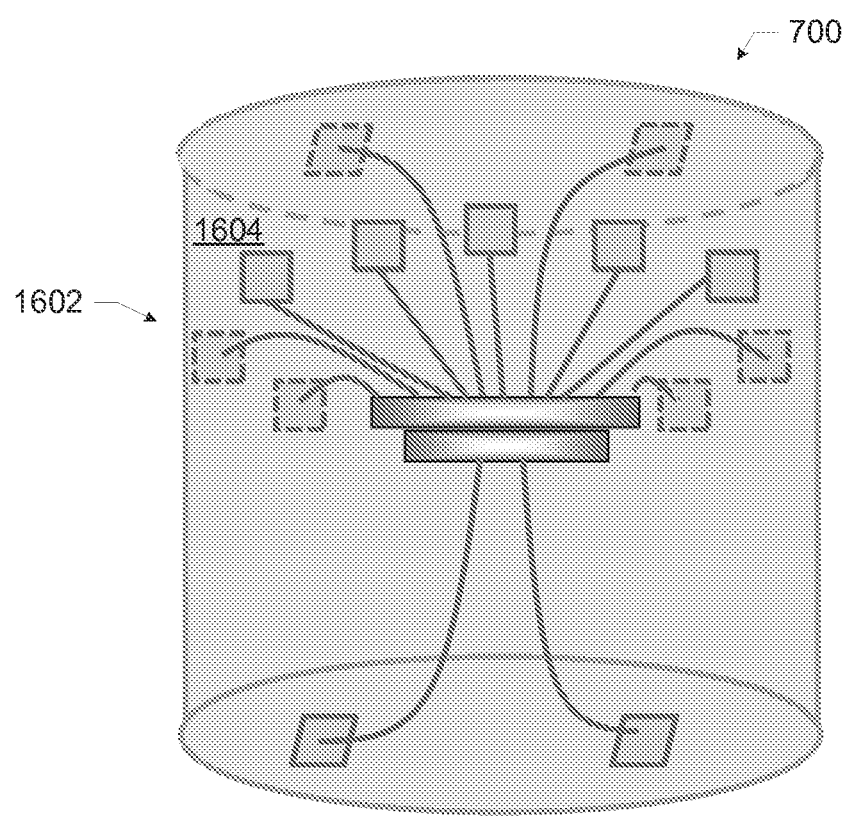

FIG. 16 illustrates an assembly subsequent to providing a mold compound 1604 to the interior of the second mold casting 1302 to form a second molded portion 1602. The second molded portion 1602 and the first molded portion 1202 (FIG. 12) may together form the molded component 700 of FIG. 8. In particular, the mold compound 1604 provided to the second mold casting 1302 may correspond to the lower portion 808 discussed above with reference to FIG. 8. As noted above with reference to the first molded portion 1202 of FIG. 12, the provision of the additional mold compound 1604 to form the lower portion 808 may include any conventional manufacturing operations associated with forming a molded material. The mold compound 1604 may be a same mold compound as a mold compound 1206, or may be a different mold compound.

In some embodiments, a molded component 700 may be included in a wearable electronic device by disposing the molded component in a socket of a wearable support structure. Suitable wearable support structures may take any of the forms described above with reference to the wearable support structure 102, for example. In some embodiments, the socket of the wearable support structure may have conductive pads disposed therein that make contact with the conductive pads included in the molded component 700 when the molded component 700 is received in the socket, and thus may enable the flow of electrical signals between the wearable support structure (which may itself include any desired electronics) and the circuitry included in the die 140 of the molded component 700. Although many of the examples of "sockets" disclosed herein may have a recess into which the molded component 700 is disposed, the socket (e.g., the socket 180) and the molded component 700 may also take an inverted form in which the socket includes a protrusion having conductive pads disposed on the surface and the molded component 700 includes a recess having conductive pads located at the outer surface. In such embodiments, the molded component 700 and the socket may be mated by receiving the protrusion of the socket into the recess of the molded component 700 so as to align the conductive pads as desired. In some embodiments, the socket may include both protruding and recessed portions that are complementary to recessed and protruding portions, respectively, of the molded component 700.

Figure 17:
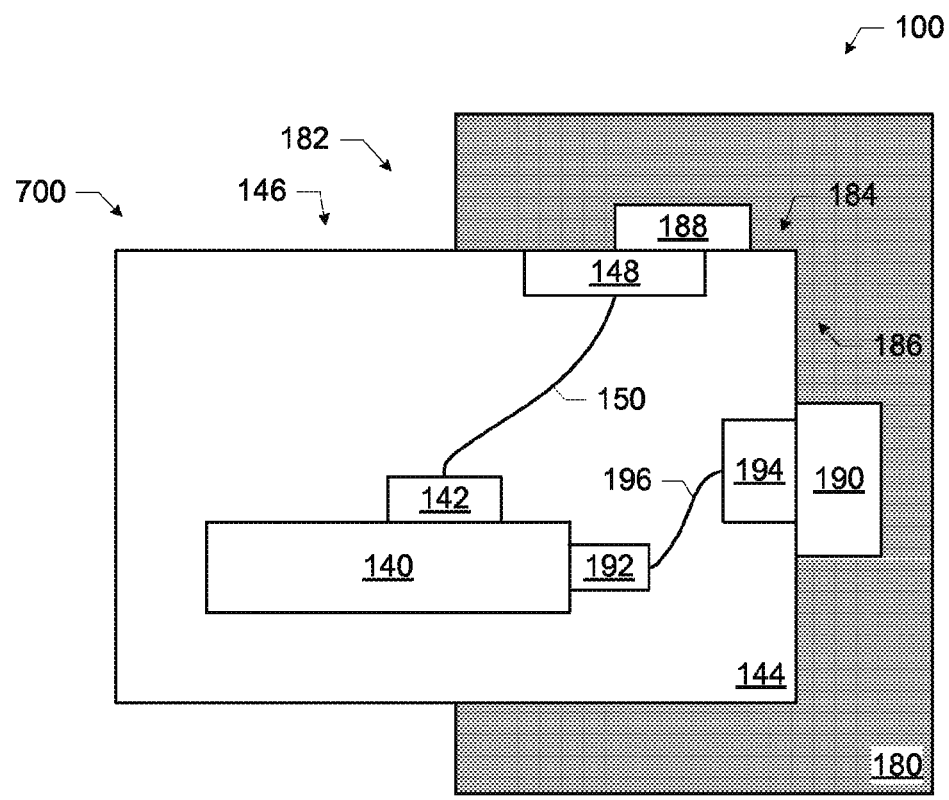
FIG. 17 illustrates a wearable electronic device in which the molded component of FIG. 7 is received in a complementary cavity of a socket, in accordance with various embodiments.

FIG. 17 illustrates a wearable electronic device 100 in which a molded component 700 is received in a complementary cavity 182 of a socket 180, in accordance with various embodiments. The socket 180 may be disposed in or otherwise secured to a wearable support structure (not shown). The cavity 182 of the socket 180 may be shaped complementarily to at least a portion of the outer surface of the mold compound 144 of the molded component 700. In some embodiments, the molded component 700 (e.g., the mold compound 144 of the molded component 700) and the socket 180 (e.g., the cavity 182 of the socket 180) may be shaped to secure the molded component 700 in the cavity 182 by a press fit when the molded component 700 is received in the cavity 182. As used herein, a "press fit" may be a fastening between two parts in which the two parts are secured by friction after being pushed together (e.g., without the need for any other fastening mechanism).

In some embodiments, a cavity of a socket in which the molded component 700 is received may have a conductive pad located at a surface of the cavity such that, when the molded component 700 is received in the cavity, a conductive pad of the molded component 700 contacts the conductive pad of the cavity. For example, FIG. 17 illustrates an embodiment in which the molded component 700 includes two conductive pads, 148 and 194, located at different outer surfaces of the mold compound 144 (the surfaces 146 and 147, respectively). As shown, each of the conductive pads 148 and 194 is coupled to a conductive contact of the die 140 (the conductive contacts 142 and 192, respectively) via an interconnect (the interconnects 150 and 196, respectively). The cavity 182 has a surface 184 at which a conductive pad 188 is located, and a surface 186 at which a conductive pad 190 is located. When the molded component 700 is received in the cavity 182, the conductive pad 148 of the molded component may contact the conductive pad 188 of the cavity 182, and the conductive pad 194 of the molded component 700 may contact the conductive pad 190 of the cavity 182. The socket 180 may include electrical signaling pathways (not shown) that may conduct electrical signals from other circuitry included in the socket 180 (or other portions of a wearable support structure on which the socket 180 is mounted) to and/or from the die 140 via the electrical coupling between the contacting conductive pads 188 and 148 and/or the contacting conductive pads 190 and 194.

Figure 18:
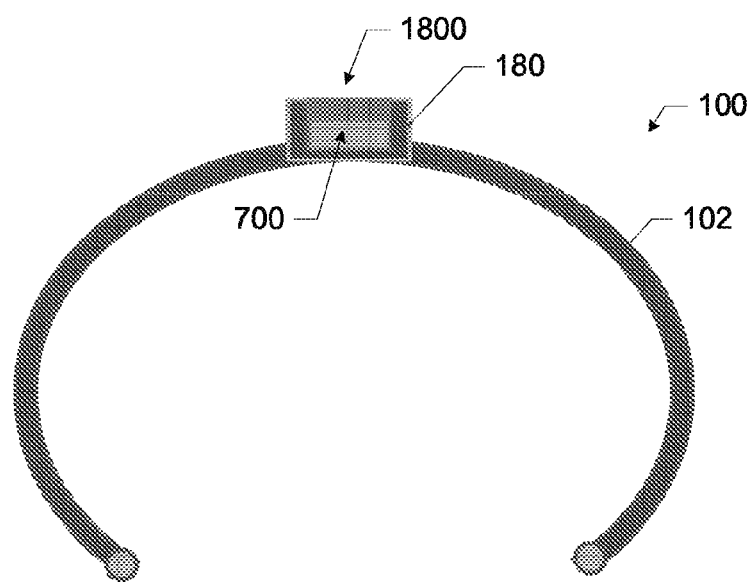
FIG. 18 is a side view of a wearable electronic device having a molded component received in a socket of a bracelet, in accordance with various embodiments.

As noted above, the socket 180 may be included in any suitable wearable support structure. For example, FIG. 18 is a side view of a wearable electronic device 100 having a molded component 700 received in a socket 180 of a bracelet-shaped wearable support structure 102, in accordance with various embodiments. In the embodiment of FIG. 18, the socket 180 may be mounted to the wearable support structure 102 (e.g., via an adhesive, solder, or by being integrally formed with the wearable support structure 102), and the molded component 700 may be received in the socket 180. A decoration 1800 (e.g., a jewel or stone) may be disposed on the molded component 700 so that the wearable electronic device 100 has the appearance of a piece of fashion jewelry. Although only a single molded component 700 is illustrated as being included in the wearable electronic device 100, a wearable electronic device 100 may include two or more molded components formed as described herein with reference to the molded component 700, which may be differently shaped and arranged, and/or may perform different functionality. In some embodiments, two or more molded components 700 included in a wearable electronic device 100 may communicate with each other (via the signaling pathways discussed above) to perform any suitable computing functions.

The shape of the molded component 700 (e.g., the shape of the mold compound 144) may take any desired form suitable for fitting with a complementary component of a wearable support structure (e.g., a pen, a bracelet, or a piece of jewelry).

In some embodiments, different molded components constructed as described above with reference to the molded component 700, but having different circuitry embedded therein, may be "swappable" in a socket 180 of a wearable electronic device 100. For example, two different molded components may both have a memory device embedded therein, but the memory device included in the first molded component may have a greater storage capacity than the memory device included in the second molded component. A user may purchase a wearable electronic device that includes the second molded component in the socket, and may "upgrade" the wearable electronic device by purchasing the first molded component, removing the second molded component from the socket, and replacing it with the first molded component. In other embodiments, different molded components may provide entirely different functionalities, and a user may be able to customize a wearable electronic device by the selection of different molded components included in a wearable electronic device (e.g., as charms on a charm bracelet or necklace).

Figure 19:
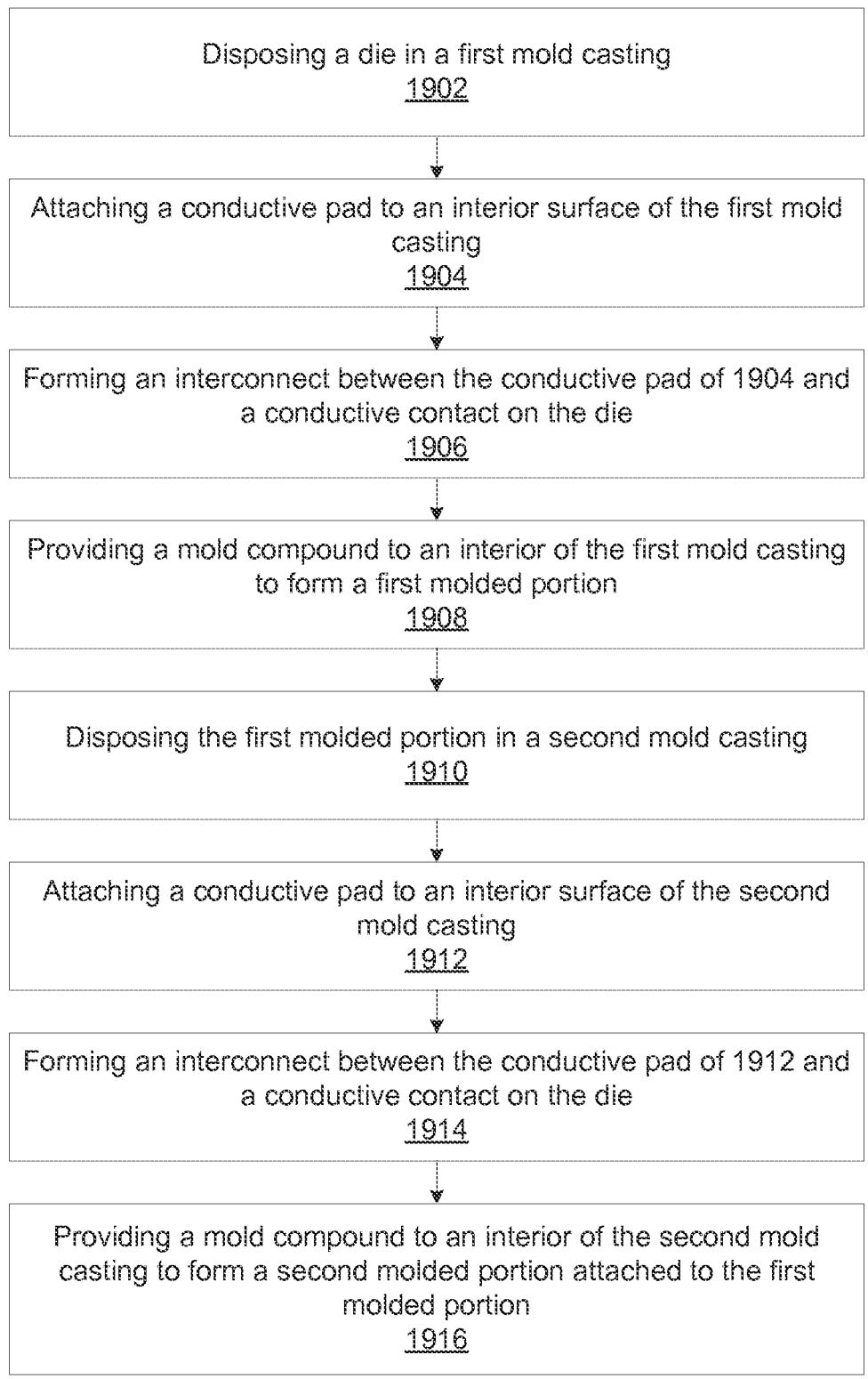
FIG. 19 is a flow diagram of a method of manufacturing a molded component (e.g., for a wearable electronic device), in accordance with various embodiments.

FIG. 19 is a flow diagram of a method of manufacturing a molded component (e.g., for a wearable electronic device), in accordance with various embodiments. Although operations of the method 1900 may be discussed with reference to the molded component 700 of FIGS. 9-16, this is simply for illustrative purposes and the method 1900 may be utilized to manufacture any suitable molded component.

At 1902, a die (e.g., the die 140) may be disposed in a first mold casting (e.g., the first mold casting 902).

At 1904, a conductive pad (e.g., the conductive pad 148) may be attached to an interior surface of the first mold casting. In some embodiments, the conductive pad may be attached to the first mold casting with an adhesive. In some embodiments, two or more conductive pads may be attached to the interior surface of the first mold casting at 1904. As noted below, in some embodiments, no conductive pads may be attached to the interior surface of the first mold casting, and thus the operations of 1904 may not be performed.

At 1906, an interconnect (e.g., the interconnect 150) may be formed between the conductive pad of 1904 and a conductive contact (e.g., the conductive contact 142) on the die. For example, the interconnect may be formed at 1906 via wire bonding. In some embodiments, two or more interconnects may be formed at 1906 (e.g., depending upon the number of conductive contacts on the die, the number of conductive pads attached to the interior surface of the first mold casting, and the desired connection pattern between the conductive contacts and the conductive pads). In embodiments in which no conductive pads were attached to the interior surface of the first mold casting, the operations of 1906 may not be performed.

At 1908, a mold compound (e.g., the mold compound 1206) may be provided to an interior of the first mold casting to form a first molded portion (e.g., the first molded portion 1202). In some embodiments, the first molded portion of 1908 may not include any conductive pads or interconnects, and thus the operations discussed above with reference to 1904 and 1906 may not be performed.

At 1910, the first molded portion of 1908 may be disposed in a second mold casting (e.g., the second mold casting 1302).

At 1912, a conductive pad (e.g., the conductive pad 164) may be attached to an interior surface of the second mold casting. In some embodiments, the conductive pad may be attached to the second mold casting with an adhesive. In some embodiments, two or more conductive pads may be attached to the interior surface of the second mold casting at 1912. As noted below, in some embodiments, no conductive pads may be attached to the interior surface of the second mold casting, and thus the operations of 1912 may not be performed.

At 1914, an interconnect (e.g., the interconnect 162) may be formed between the conductive pad of 1912 and a conductive contact (e.g., the conductive contact 160) on the die. For example, the interconnect may be formed at 1906 via wire bonding. In some embodiments, two or more interconnects may be formed at 1914 (e.g., depending upon the number of conductive contacts on the die, the number of conductive pads attached to the interior surface of the first mold casting, and the desired connection pattern between the conductive contacts and the conductive pads). In embodiments in which no conductive pads were attached to the interior surface of the second mold casting, the operations of 1914 may not be performed.

At 1916, a mold compound (e.g., the mold compound 1604) may be provided to an interior of the second mold casting to form a second molded portion (e.g., the second molded portion 1602) attached to the first molded portion of 1908. The first molded portion of 1908 and the second molded portion of 1916 may together form a molded component (e.g., the molded component 700). In some embodiments, the second molded portion of 1916 may not include any conductive pads or interconnects, and thus the operations discussed above with reference to 1912 and 1914 may not be performed. At least one of the first molded portion (1908) and the second molded portion (1916) may include one or more conductive pads. In some embodiments, both the first molded portion (1908) and the second molded portion (1916) may include one or more conductive pads.

In some embodiments, the wearable electronic device 100 of FIG. 1 may be implemented within the molded component 700, or distributed between the molded component 700 and the socket 180. For example, the die 140 of the molded component 700 may include a resistance switch 114, and conductive pads located at the outer surface of the mold compound 144 may serve as the electrodes 108 and 110. In some embodiments, the load circuit 120 may be included in the die 140, while in other embodiments, the load circuit 120 may be included in the socket 180 or in another portion of the wearable support structure on which the socket 180 is disposed.

Figure 20:
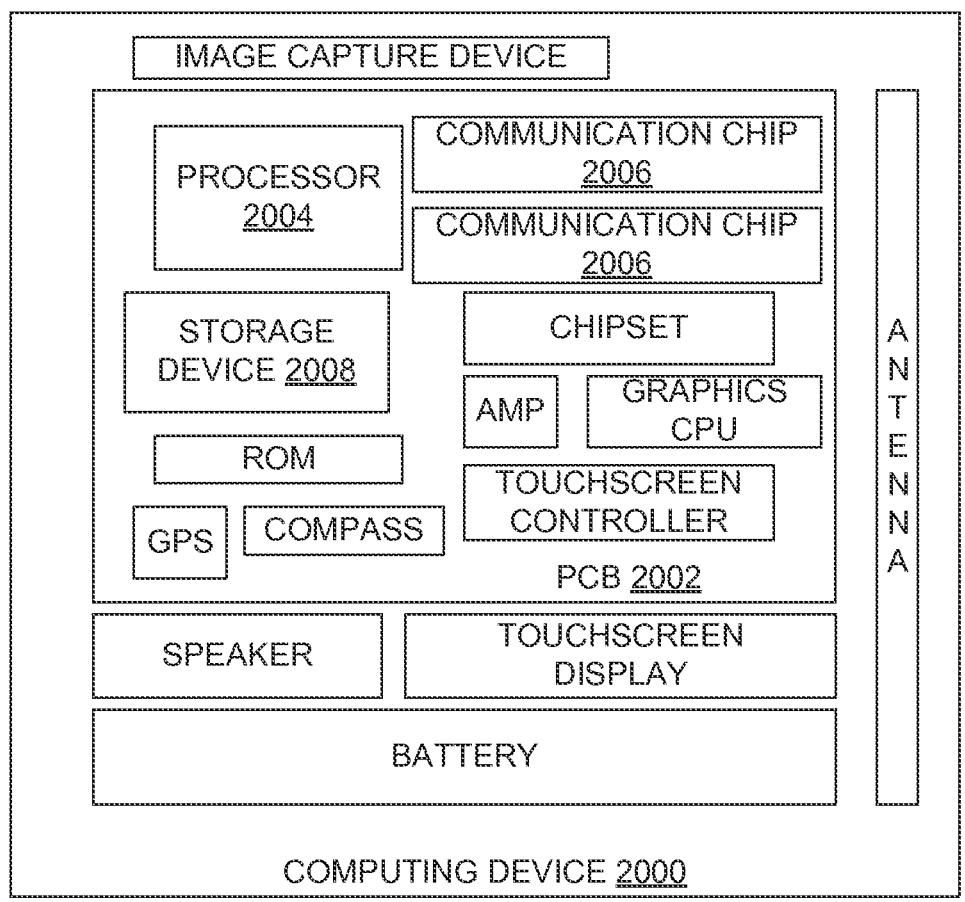
FIG. 20 is a block diagram of an example computing device that may be implemented, in whole or in part, by any of the wearable electronic devices or components thereof disclosed herein.

Any suitable computing system may be implemented, in whole or in part, by the wearable electronic devices, components thereof, and manufacturing techniques disclosed herein. FIG. 20 schematically illustrates a computing device 2000 that may be included, in whole or in part, in any of the wearable electronic devices and components thereof disclosed herein (e.g., any of the wearable computable devices 100 or molded components 700).

The computing device 2000 may be, for example, a mobile communication device. The computing device 2000 may house a board such as printed circuit board (PCB) 2002. The PCB 2002 may include a number of components, including (but not limited to) a processor 2004 and at least one communication chip 2006. The term "processor" may refer to any device or portion of a device that processes electronic data from registers and/or memory to transform that electronic data into other electronic data that may be stored in registers and/or memory. As noted above, in some embodiments, no PCB 2002 may be included in a wearable electronic device (e.g., in a molded component 700) and the various computing components discussed with reference to the computing device 2000 may be included without attachment to a PCB support structure. In some embodiments, the processor 2004 may be physically and electrically coupled to the at least one communication chip 2006. In some embodiments, the communication chip 2006 may be part of the processor 2004.

The computing device 2000 may include a storage device 2008. In some embodiments, the storage device 2008 may include one or more solid state drives. Examples of storage devices that may be included in the storage device 2008 include volatile memory (e.g., dynamic random access memory (DRAM)), non-volatile memory (e.g., read-only memory (ROM)), flash memory, and mass storage devices (such as hard disk drives, compact discs (CDs), digital versatile discs (DVDs), and so forth).

Depending on its applications, the computing device 2000 may include other components. These other components may include, but are not limited to, a graphics processor, wireless transceiver circuitry, a digital signal processor, a crypto processor, a chipset, an antenna, a display, a touchscreen display, a touchscreen controller, a battery, an audio codec, a video codec, a power amplifier, a global positioning system (GPS) device, a compass, a Geiger counter, an accelerometer, a gyroscope, a speaker, an image capture device, and control circuitry for voice and/or video communication. In various embodiments, control of any one or more of these components may be effected by contact with the electrodes 108 and 110 in embodiments of the wearable electronic device 100 and flash or via control signals transmitted to the die 140 via the one or more conductive pads included in the molded component 700.

The communication chip 2006 and the antenna may enable wireless communications for the transfer of data to and from the computing device 2000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 2006 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible broadband wide area (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 2006 may operate in accordance with a Global System for Mobile Communications (GSM), General Packet Radio Service (GPRS), Universal Mobile Telecommunications System (UMTS), High Speed Packet Access (HSPA), Evolved HSPA (E-HSPA), or LTE network. The communication chip 2006 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 2006 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 2006 may operate in accordance with other wireless protocols in other embodiments.

The computing device 2000 may include a plurality of communication chips 2006. For instance, a first communication chip 2006 may be dedicated to shorter range wireless communications such as Wi-Fi and Bluetooth, and a second communication chip 2006 may be dedicated to longer range wireless communications such as GPS, EDGE, GPRS, CDMA, WiMAX, LTE, EV-DO, and others. In some embodiments, the communication chip 2006 may support wired communications.

In various implementations, the computing device 2000 may implement any suitable functionalities typically implemented in a laptop, a netbook, a notebook, an ultrabook, a smartphone, a tablet, a personal digital assistant (PDA), an ultra mobile PC, a mobile phone, a desktop computer, a monitor, a set-top box, an entertainment control unit, a digital camera, a portable music player, or a digital video recorder. In some embodiments, the computing device 2000 may be any other electronic device that processes data.

The following paragraphs provide examples of the embodiments disclosed herein.

Example 1 is a wearable electronic device, including: a wearable support structure having a first surface and a second surface; a first electrode located at the first surface, wherein, when the wearable electronic device is worn by a user on a portion of the users body, the first electrode is arranged to contact the user's skin in the portion of the users body; a second electrode located at the second surface, wherein, when the wearable electronic device is worn by the user on the portion of the user's body, the second electrode is arranged to not contact the users skin in the portion of the user's body; and a resistance switch having first and second input terminals coupled to the first and second electrodes, respectively.

Example 2 may include the subject matter of Example 1, and may further specify that the first electrode extends away from the first surface.

Example 3 may include the subject matter of any of Examples 1-2, and may further specify that the first electrode is plated on the wearable support structure.

Example 4 may include the subject matter of any of Examples 1-3, and may further specify that the first electrode is embedded in the wearable support structure.

Example 5 may include the subject matter of any of Examples 1-4, and may further include: a third electrode located at the second surface; and a second resistance switch having first and second input terminals coupled to the first and third electrodes, respectively.

Example 6 may include the subject matter of any of Examples 1-4, and may further include: a third electrode located at the second surface; a fourth electrode located at the first surface; and a second resistance switch having first and second input terminals coupled to the third and fourth electrodes, respectively.

Example 7 may include the subject matter of any of Examples 1-4, and may further include a third electrode located at the first surface, wherein the third electrode is coupled to the first electrode.

Example 8 may include the subject matter of any of Examples 1-7, and may further specify that the resistance switch comprises first and second output terminals, and wherein the wearable electronic device further comprises a load circuit coupled between the first and second output terminals.

Example 9 may include the subject matter of any of Examples 1-8, and may further specify that the wearable support structure is a band, the first surface is an interior of the band, and the second surface is an exterior of the band.

Example 10 may include the subject matter of any of Examples 1-9, and may further specify that the wearable support structure is a pair of glasses and the first surface is an interior of an earpiece of the pair of glasses.

Example 11 is a method of manufacturing a wearable electronic device, including: providing a wearable support structure having a first surface and a second surface, wherein: a first electrode is located at the first surface such that, when the wearable electronic device is worn by a user on a first portion of the user's body, the first electrode is arranged to contact the user's skin in the first portion of the user's body, a second electrode is located at the second surface such that, when the wearable electronic device is worn by the user on the first portion of the user's body, the second electrode is arranged to not contact the users skin in the first portion of the users body, and first and second input terminals of a resistance switch are coupled to the first and second electrodes, respectively; and coupling a load circuit between first and second output terminals of the resistance switch such that, when the wearable electronic device is worn by the user on the first portion of the user's body and the user contacts the second electrode with a second portion of the user's body, a current flows between the first and second output terminals.

Example 12 may include the subject matter of Example 11, and may further specify that the load circuit is a wireless transceiver control circuit arranged so that current flow between the first and second output terminals turns a wireless transceiver on and/or off, a voice communication control circuit arranged so that current flow between the first and second output terminals causes a voice communication session to start and/or end, or an image capture device control circuit arranged so that current flow between the first and second output terminals causes an image capture device to capture an image.

Example 13 is a wearable electronic device, including: a die having a conductive contact thereon; a mold compound having an outer surface, wherein the die is embedded in the mold compound; a conductive pad located at the outer surface of the mold compound; and an interconnect between the conductive contact of the die and the conductive pad.

Example 14 may include the subject matter of Example 13, and may further specify that: the outer surface is a first outer surface, the conductive contact is a first conductive contact, the conductive pad is a first conductive pad, and the interconnect is a first interconnect; the die has a second conductive contact thereon; the mold compound has a second outer surface different from the first outer surface; a second conductive pad is located at the second outer surface of the mold compound; and the wearable electronic device comprises a second interconnect between the second conductive contact of the die and the second conductive pad.

Example 15 may include the subject matter of Example 14, and may further specify that the die has a first surface and a second surface different from the first surface, and wherein the first conductive contact is located at the first surface and the second conductive contact is located at the second surface.

Example 16 may include the subject matter of any of Examples 13-15, and may further specify that the conductive pad is held in place on the outer surface of the mold compound by the mold compound without the use of a printed circuit board to support the conductive pad.

Example 17 may include the subject matter of any of Examples 13-16, and may further specify that the interconnect comprises a wirebonded interconnect.

Example 18 may include the subject matter of any of Examples 13-17, and may further specify that the conductive pad is a first conductive pad, and may further include a socket having a cavity shaped complementarily to at least a portion of the outer surface of the mold compound, and further having a second conductive pad located at a surface of the cavity such that, when the mold compound is received in the cavity, the first conductive pad contacts the second conductive pad.

Example 19 may include the subject matter of Example 18, and may further specify that the mold compound and the socket are shaped to secure the mold compound in the cavity by a press fit when the mold compound is received in the cavity.

Example 20 is a method of manufacturing a molded component for a wearable electronic device, including: a) disposing a die in a first mold casting; b) providing a mold compound to an interior of the first mold casting to form a first molded portion; c) disposing the first molded portion in a second mold casting; d) providing a mold compound to an interior of the second mold casting to form a second molded portion attached to the first molded portion; wherein the method further comprises, between a) and b) or between c) and d): e) attaching a conductive pad to an interior surface of the corresponding mold casting, and f) forming an interconnect between the conductive pad and a conductive contact on the die.

Example 21 may include the subject matter of Example 20, and may further specify that forming the interconnect comprises wirebonding the interconnect.

Example 22 may include the subject matter of any of Examples 20-21, and may further specify that e) and f) are performed between a) and b) and also between c) and d).

Example 23 may include the subject matter of any of Examples 20-22, and may further specify that attaching a conductive pad to an interior surface of the corresponding mold casting comprises attaching the conductive pad to the interior surface with an adhesive.

Example 24 may include the subject matter of any of Examples 20-23, and may further specify that the conductive pad is held place by the mold compound when the corresponding mold casting is removed.

Example 25 may include the subject matter of any of Examples 20-24, and may further specify that the first mold casting or the second mold casting has a shape different than a rectangular solid.

What is claimed is:

1. A wearable electronic device, comprising:
a wearable support structure having a first surface and a second surface;
a first electrode located at the first surface, wherein, when the wearable electronic device is worn by a user on a portion of the user's body, the first electrode is arranged to contact the user's skin in the portion of the user's body;
a second electrode located at the second surface, wherein, when the wearable electronic device is worn by the user on the portion of the user's body, the second electrode is arranged to not contact the user's skin in the portion of the user's body; and
a resistance switch having:
first and second input terminals coupled to the first and second electrodes, respectively;
a reference voltage coupled to the first input terminal;
a transistor including: a base, wherein the second input terminal is coupled to the base, wherein the base is coupled to a ground; an emitter; and a collector coupled to the reference voltage;
a first output terminal coupled to the emitter; and
a second output terminal coupled to the ground, wherein the first and second output terminals are to couple to a load circuit, to provide a control signal to the load circuit in response to a change in resistance between the first and second input terminals caused by a contact of the first and second electrodes with the user's skin.

2. The wearable electronic device of claim 1, wherein the first electrode extends away from the first surface.

3. The wearable electronic device of claim 1, wherein the first electrode is plated on the wearable support structure.

4. The wearable electronic device of claim 1, wherein the first electrode is embedded in the wearable support structure.

5. The wearable electronic device of claim 1, further comprising:
   a third electrode located at the first surface;
   wherein the third electrode is coupled to the first electrode.

6. The wearable electronic device of claim 1, wherein the resistance switch comprises first and second output terminals, and wherein the wearable electronic device further comprises a load circuit coupled between the first and second output terminals.

7. The wearable electronic device of claim 1, wherein the wearable support structure is a band, the first surface is an interior of the band, and the second surface is an exterior of the band.

8. The wearable electronic device of claim 1, wherein the wearable support structure is a pair of glasses and the first surface is an interior of an earpiece of the pair of glasses.

9. A method of manufacturing a wearable electronic device, comprising:
   providing a wearable support structure having a first surface and a second surface, including:
   placing a first electrode at the first surface such that, when the wearable electronic device is worn by a user on a first portion of a user's body, the first electrode is arranged to contact a user's skin in the first portion of the user's body,
   placing a second electrode at the second surface such that, when the wearable electronic device is worn by the user on the first portion of the user's body, the second electrode is arranged to remain free from contact the user's skin in the first portion of the user's body, and
   providing a resistance switch to couple to the first and second electrodes, respectively, including:
   connecting a reference voltage to a first input terminal of the resistance switch; connecting a base of a transistor to a second input terminal of the resistance switch,
   connecting the base to a ground; connecting a collector of the transistor to the reference voltage;
   connecting a first output terminal of the resistance switch to an emitter of the transistor; and
   connecting a second output terminal to the ground; and
   coupling a load circuit between first and second output terminals of the resistance switch such that, to provide a control signal to the load circuit in response to a change in resistance between the first and second input terminals caused by a contact of the first and second electrodes with the user's skin.

10. The method of claim 9, wherein the load circuit is a wireless transceiver control circuit arranged so that the control signal turns a wireless transceiver on and/or off, a voice communication control circuit arranged so that the control signal causes a voice communication session to start and/or end, or an image capture device control circuit arranged so that the control signal causes an image capture device to capture an image.

* * * * *